(12) United States Patent
Sharma et al.

(10) Patent No.: US 11,573,976 B2
(45) Date of Patent: Feb. 7, 2023

(54) METHOD AND APPARATUS FOR MANAGING A SERVICE REQUEST IN A BLOCKCHAIN NETWORK

(71) Applicant: Samsung Electronics Co., Ltd., Suwon-si (KR)

(72) Inventors: Abhishek Sharma, Bengaluru (IN); Mainak Choudhury, Bangalore (IN); Vikalp Mullick, Jabalpur (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 307 days.

(21) Appl. No.: 16/135,676

(22) Filed: Sep. 19, 2018

(65) Prior Publication Data
US 2019/0087446 A1   Mar. 21, 2019

(30) Foreign Application Priority Data

Sep. 20, 2017 (IN) .............................. 201741033389
Aug. 30, 2018 (IN) .............................. 201741033389

(51) Int. Cl.
*G06F 16/27* (2019.01)
*G06Q 20/38* (2012.01)
(Continued)

(52) U.S. Cl.
CPC .......... *G06F 16/27* (2019.01); *G06F 16/1805* (2019.01); *G06F 16/245* (2019.01);
(Continued)

(58) Field of Classification Search
CPC .. G06F 16/9024; G06F 9/466; G06F 16/9027; G06F 3/0482; G06F 8/38;
(Continued)

(56) References Cited

U.S. PATENT DOCUMENTS 8,417,677 B2 * 4/2013 Nagoya ................. G06F 21/552
707/694
10,022,613 B2 * 7/2018 Tran ........................ G06F 3/011
(Continued)

FOREIGN PATENT DOCUMENTS

KR   10-1596904 B1   2/2016
WO   2017/145019 A   8/2017

OTHER PUBLICATIONS

International Search Report dated Jan. 11, 2019; International application # PCT/KR2018/010890.
(Continued)

*Primary Examiner* — Tony Mahmoudi
*Assistant Examiner* — Linh Black
(74) *Attorney, Agent, or Firm* — Jefferson IP Law, LLP

(57) ABSTRACT

A method and an apparatus for managing a service request in a blockchain network are provided. The method includes receiving, by a first device, a service request, identifying an intent from the service request, selecting one or more atomic contracts, each of which is related to the intent, wherein the atomic contracts are associated with a second device on the blockchain network and are verified in the blockchain network, generating a new contract including the atomic contracts, and broadcasting the new contract over the blockchain network.

11 Claims, 19 Drawing Sheets

(51) Int. Cl.
- *G06F 16/245* (2019.01)
- *G06F 16/18* (2019.01)
- *G06Q 50/06* (2012.01)
- *G06Q 10/02* (2012.01)
- *G06Q 50/30* (2012.01)

(52) U.S. Cl.
CPC .......... *G06Q 10/02* (2013.01); *G06Q 20/382* (2013.01); *G06Q 50/06* (2013.01); *G06Q 50/30* (2013.01); *G06Q 2220/00* (2013.01)

(58) Field of Classification Search
CPC ..... G06F 3/048; H04L 2209/38; H04L 67/20; H04L 67/22; H04L 63/064; G16H 20/30; G16H 40/63; G16H 50/20; G16H 10/40; G16H 10/60; G16H 15/00; G16H 40/20; G16H 40/60; G16H 40/67; G16H 50/30; G16H 70/40; G16H 80/00; G06Q 20/12; G06Q 30/0625; G06Q 30/0633; G06Q 30/0635; G06Q 30/0641; G06Q 20/40; G06Q 20/3223; G07G 1/0009
USPC ....... 707/631, 694, 701, 703, 708, 755, 763, 707/778, 786, 829, 17.011
See application file for complete search history.

(56) References Cited

U.S. PATENT DOCUMENTS

| | | | | |
|---|---|---|---|---|
| 10,360,191 | B2* | 7/2019 | Christidis | H04L 9/3236 |
| 10,454,690 | B1* | 10/2019 | Popoveniuc | H04L 9/3268 |
| 10,469,487 | B1* | 11/2019 | Griffin | H04L 9/3242 |
| 10,621,510 | B2* | 4/2020 | Saxena | H04L 63/12 |
| 10,755,226 | B1* | 8/2020 | Robyak | G06K 7/10366 |
| 2008/0228619 | A1 | 9/2008 | Locker et al. | |
| 2014/0324633 | A1* | 10/2014 | Pollak | G06Q 10/083 705/26.63 |
| 2015/0088648 | A1* | 3/2015 | Chitnis | G06F 16/2457 705/14.54 |
| 2015/0244690 | A1* | 8/2015 | Mossbarger | H04L 9/3263 713/171 |
| 2015/0278820 | A1 | 10/2015 | Meadows | |
| 2016/0098723 | A1* | 4/2016 | Feeney | G06Q 20/065 705/75 |
| 2016/0267601 | A1* | 9/2016 | Kundu | G06Q 20/10 |
| 2016/0292680 | A1* | 10/2016 | Wilson, Jr. | G06Q 20/40 |
| 2017/0005804 | A1* | 1/2017 | Zinder | H04L 63/123 |
| 2017/0011460 | A1 | 1/2017 | Molinari et al. | |
| 2017/0103468 | A1 | 4/2017 | Orsini et al. | |
| 2017/0140408 | A1* | 5/2017 | Wuehler | G06Q 30/0207 |
| 2017/0206522 | A1* | 7/2017 | Schiatti | G06Q 50/06 |
| 2017/0256000 | A1* | 9/2017 | Isaacson | G06Q 20/36 |
| 2017/0285915 | A1 | 10/2017 | Napolitano et al. | |
| 2017/0287090 | A1* | 10/2017 | Hunn | G06Q 50/18 |
| 2017/0295232 | A1* | 10/2017 | Curtis | G06F 9/466 |
| 2017/0351706 | A1* | 12/2017 | Kong | G06F 16/9535 |
| 2018/0005186 | A1* | 1/2018 | Hunn | G06F 40/103 |
| 2018/0069899 | A1* | 3/2018 | Lang | G06F 8/38 |
| 2018/0096752 | A1* | 4/2018 | Ovalle | G07F 17/3223 |
| 2018/0117446 | A1* | 5/2018 | Tran | A42B 3/0433 |
| 2018/0130050 | A1* | 5/2018 | Taylor | H04L 9/3236 |
| 2018/0165416 | A1* | 6/2018 | Saxena | G16H 50/20 |
| 2018/0165598 | A1* | 6/2018 | Saxena | G06N 5/04 |
| 2018/0165611 | A1* | 6/2018 | Saxena | G06N 5/04 |
| 2018/0165758 | A1* | 6/2018 | Saxena | G06N 20/00 |
| 2019/0026821 | A1* | 1/2019 | Bathen | G06Q 40/00 |
| 2019/0058709 | A1* | 2/2019 | Kempf | H04L 9/3226 |
| 2019/0227515 | A1* | 7/2019 | Fink | G05B 19/0425 |

OTHER PUBLICATIONS

Cognizant 20-20 Insights, Blockchain's Smart Contracts: Driving the Next Wave of Innovation Across Manufacturing Value Chains; Jun. 2016.
Beaver: A Decentralized Anonymous Marketplace with Secure Reputation; Aug. 21, 2016.
Regerator: A Registry Generator for Blockchain; Jun. 12, 2017.
Extended European Search Report dated May 8, 2020, issued is European Application No. 18859692.8.

* cited by examiner

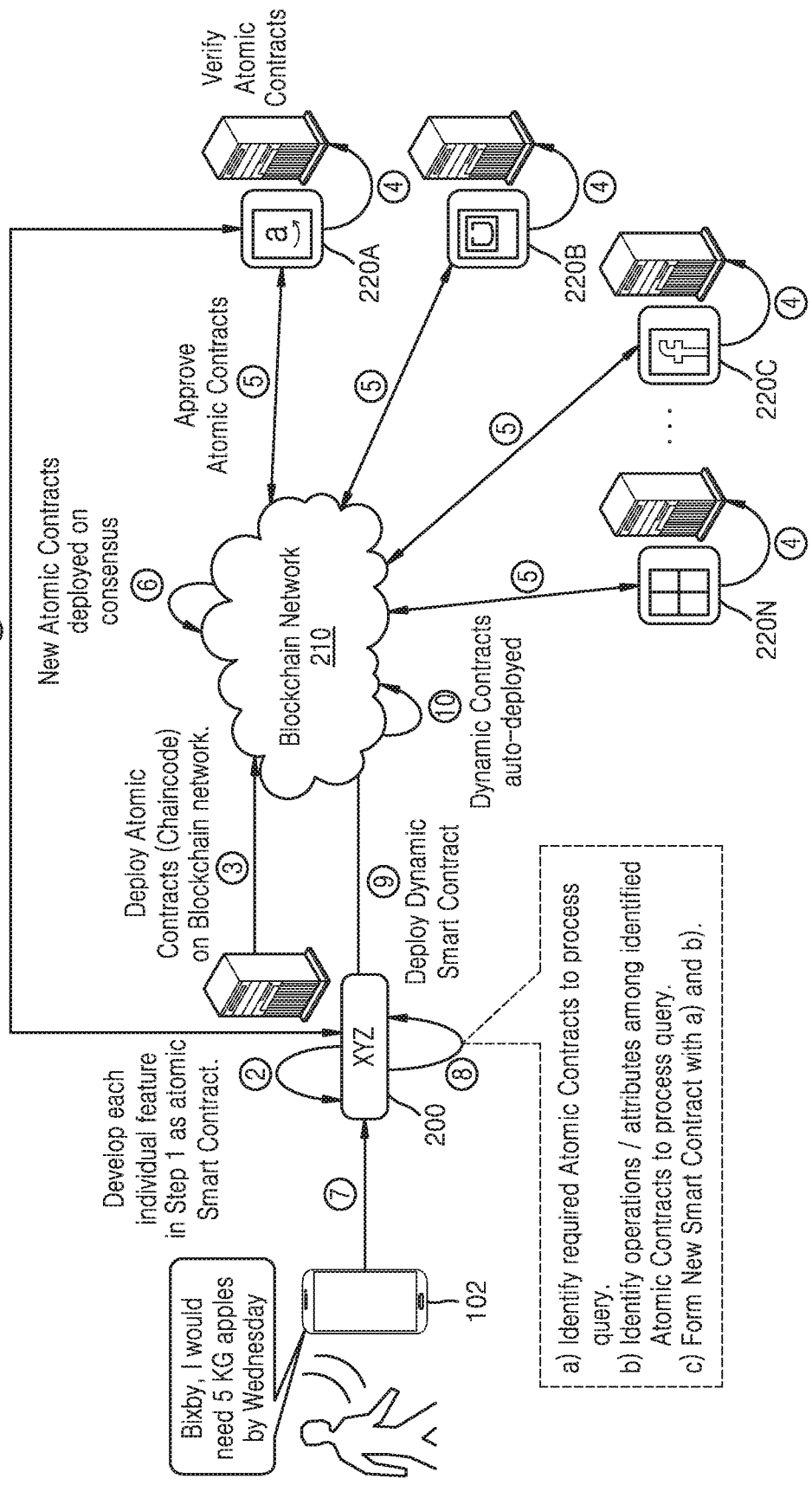

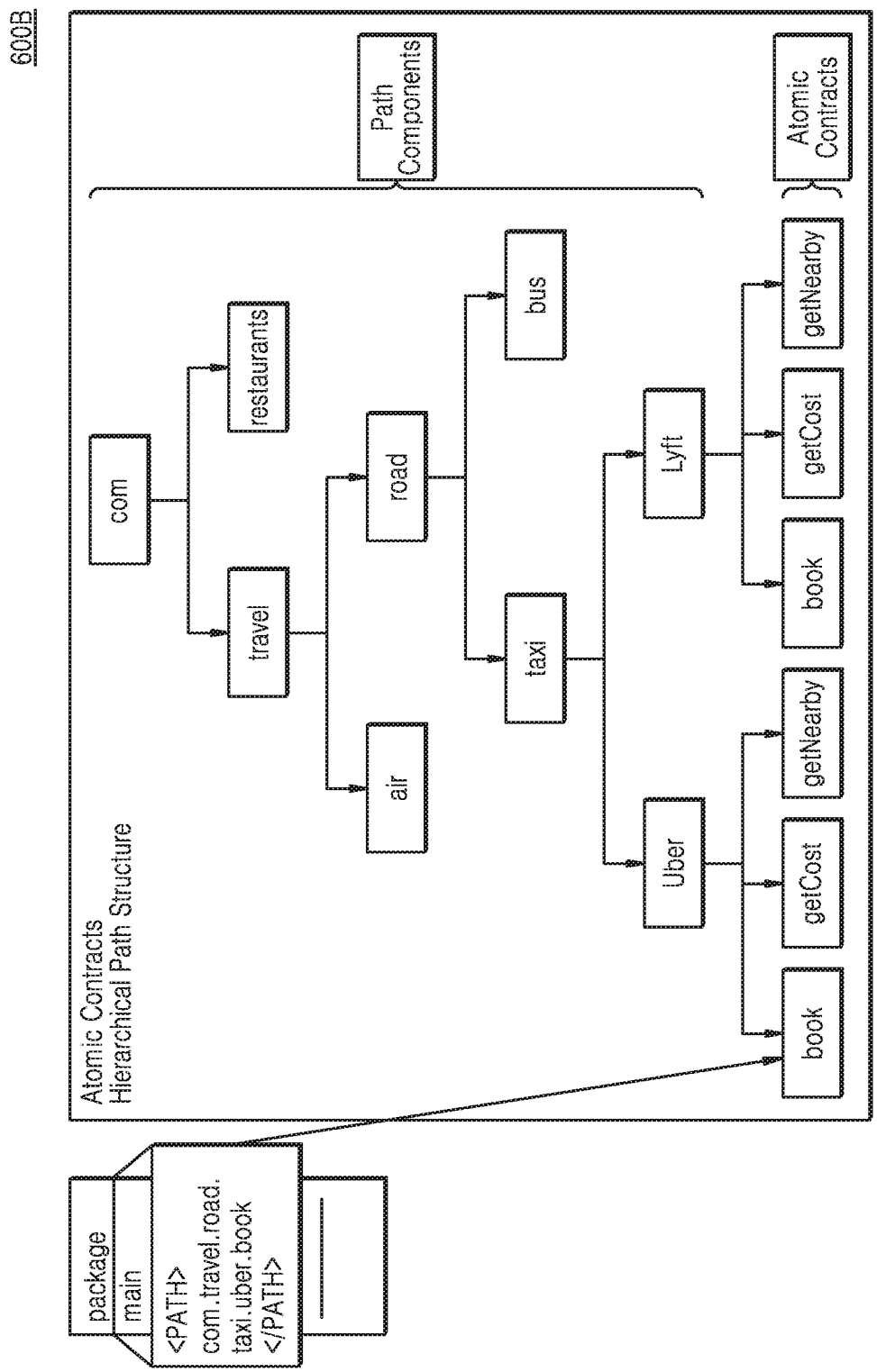

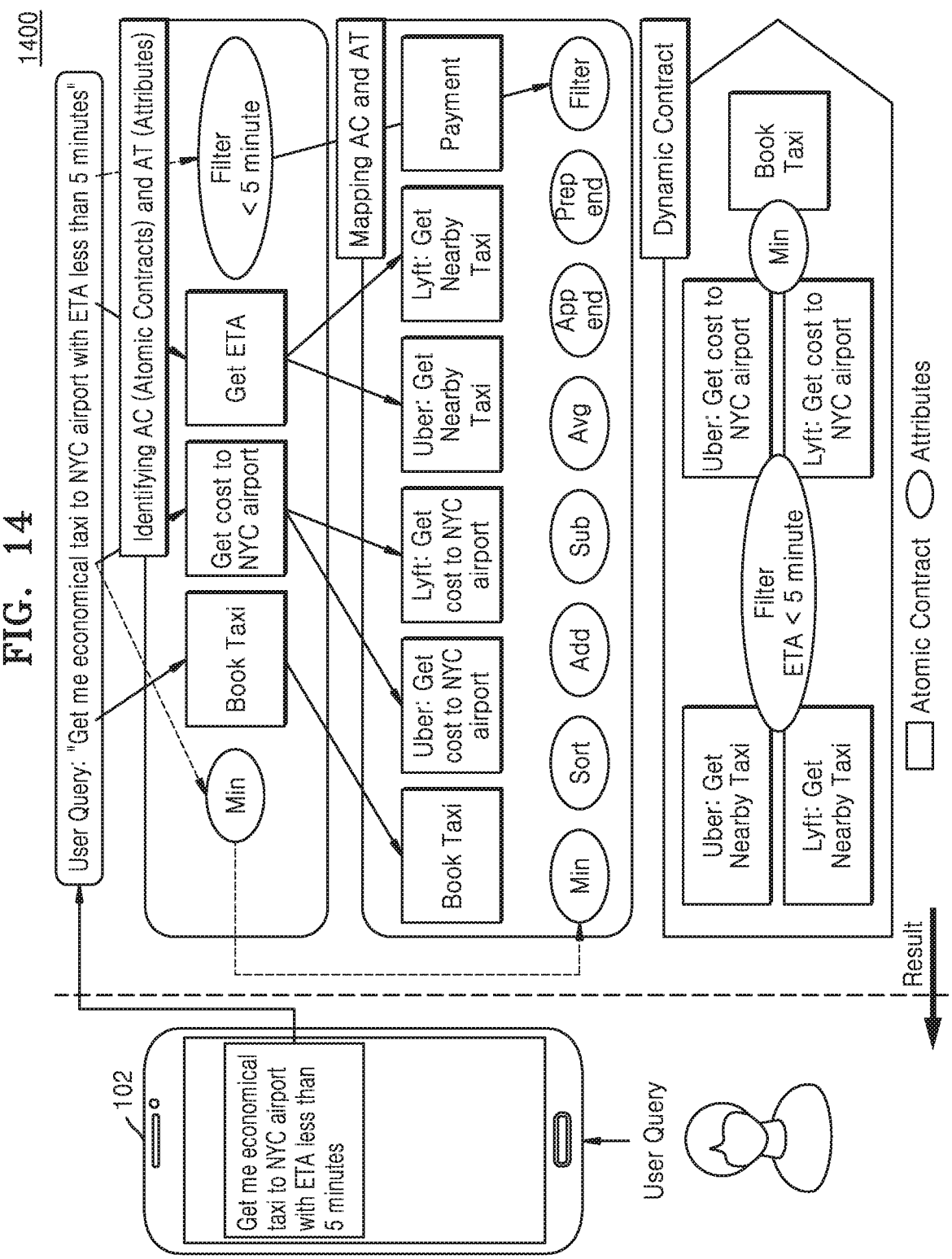

METHOD AND APPARATUS FOR MANAGING A SERVICE REQUEST IN A BLOCKCHAIN NETWORK

CROSS-REFERENCE TO RELATED APPLICATION(S)

This application is based on and claims priority under 35 U.S.C. § 119 of an Indian provisional patent application number 201741033389, filed on Sep. 20, 2017, in the Indian Patent Office, and an Indian patent application number 201741033389, filed on Aug. 30, 2018, in the Indian Patent Office, the disclosure of each of which is incorporated by reference herein in its entirety.

BACKGROUND

1. Field

The disclosure relates to blockchain-based networks. More particularly, the disclosure relates to a method for managing one or more smart contracts in a blockchain-based network.

2. Description of Related Art

Technology-based on blockchains is gradually becoming ubiquitous, covering several parts of lives. A smart contract is a programmable code deployed in a blockchain network. The smart contract is used to provide controlled access to a shared ledger on the blockchain network by querying and triggering new transactions. Generally, the smart contract is validated and deployed by all stakeholders in the blockchain network through a consensus process. Consensus ensures that the ledgers are exact copies, and lowers the risk of fraudulent transactions because tampering would have to occur across many places at exactly the same time. As generally known, the core of any blockchain platform is the ledger which is a shared, tamper-proof history of the universe. Specifically, the ledger is a record of all transactions within its scope. Chaincode is the term for programs that run on top of the blockchain to implement the business logic of how applications interact with the ledger. When a transaction is proposed, it triggers chaincode that decides what state change should be applied to the ledger. For example, chaincode for the sale of bitcoin would check that the seller actually has bitcoin to sell.

The Blockchain has grown out of Bitcoin shadow and a host of new use cases are being realized in the financial domain. The major reason for Blockchain-based solutions gaining attractions in an internet of things (IoT) domains are a standard interface for interaction with third party services. Flexibility to design blockchain solutions (public or private) based on multiple open source solutions. Trust in the system is enabled by smart contracts and consensus mechanism.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method of managing smart contracts in a blockchain network.

Additional aspects will be set forth in part in the description which follows and, in part, will be apparent from the description, or may be learned by practice of the presented embodiments.

In accordance with an aspect of the disclosure, a method of managing a service request in a blockchain network is provided. The method includes receiving, by a first device, a service request, identifying at least one intent from the service request, selecting a plurality of atomic contracts each of which is related to the at least one intent, wherein the plurality of atomic contracts is associated with at least one second device on the blockchain network and are verified in the blockchain network, generating a new contract including the plurality of atomic contracts, and broadcasting the new contract over the blockchain network.

In an embodiment of the disclosure, the method further comprises determining at least one service request item or at least one attribute by parsing a statement included in the service request, and identifying a plurality of keywords based on the at least one service request item or the at least one attribute, wherein the identifying of the at least one intent comprises identifying the at least one intent based on the plurality of keywords.

In an embodiment of the disclosure, the method further comprises identifying a plurality of services included in the service request, categorizing the plurality of services based on types of the identified plurality of services, wherein the types are determined based on the at least one of the at least one service request item or the at least one attribute, and establishing a hierarchical level among the plurality of services based on the categorizing.

In an embodiment of the disclosure, the method further comprises determining whether the at least one of atomic contract, among the plurality of atomic contracts, is unavailable, and selecting an alternative atomic contract replacing the at least one of atomic contract determined to be unavailable, based on the hierarchical level among the plurality of services, wherein the generating of the new contract comprises generating the new contract including the alternative atomic contract instead of the at least one atomic contract determined to be unavailable.

In an embodiment of the disclosure, a service, among the plurality of services corresponding to the alternative atomic contract is positioned at the same level in the established hierarchical level as a service corresponding to the at least one atomic contract determined to be unavailable.

In an embodiment of the disclosure, the selecting of the plurality of atomic contracts, each of which is related to the at least one intent, comprises mapping the at least one service request item or the at least one attribute to at least one atomic contract among the plurality of atomic contracts.

In an embodiment of the disclosure, the at least one attribute comprises at least one of an identifier indicative of a quality of the service, a cost of the service, time spent for the service, or an availability of the service.

In an embodiment of the disclosure, the method further comprises determining whether the at least one of atomic contract, among the plurality of atomic contracts, is unavailable, and identifying an alternative atomic contract for replacing the at least one of atomic contract among the determined plurality of atomic contracts, wherein the generating of the new contract comprises generating the new contract including the alternative atomic contract instead of the at least one atomic contract determined to be unavailable.

In an embodiment of the disclosure, the generated new contract is added to the blockchain network upon determining a consensus among participants of the blockchain network.

In an embodiment of the disclosure, a first atomic contract among the plurality of the atomic contacts is deployed over the blockchain network with a whitelist specifying another atomic contract which can be used with the first atomic contract associated with the whitelist and a blacklist specifying yet another atomic contract which cannot be used with the first atomic contract associated with the blacklist.

In an embodiment of the disclosure, the selecting of the plurality of atomic contracts comprises filtering the plurality of atomic contracts with the whitelist and the blacklist.

In an embodiment of the disclosure, the first atomic contract, the whitelist and the blacklist associated with the first atomic contract are verified by participants of the blockchain network on the blockchain network and added to the blockchain network upon the approval.

In an embodiment of the disclosure, the service request comprises at least one of a voice request text-based request.

In accordance with an aspect of the disclosure there is provided a method of receiving by a first electronic device, a service request, identifying by the first electronic device at least one intent of the service request, determining, by the first electronic device, whether at least one atomic contract, associated with at least one second electronic device on the blockchain network, is related to the identified intent and available in the blockchain, dynamically creating a smart contract pipeline of the at least one atomic contract based on the service request, and transmitting the smart contract to the at least one second electronic device.

In an embodiment of the disclosure, the method further includes identifying by the first electronic device at least one intent of the service request by parsing the service request to determine at least one service request item and at least one attribute, determining a plurality of contextual parameters based on the at least one attribute and the at least one service request item, and identifying at least one intent based on the plurality of contextual parameters.

In an embodiment of the disclosure, the at least one service request item comprises at least one of an identifier of the at least one service electronic device, or an identifier indicative of a service.

In an embodiment of the disclosure, the at least one associated attribute comprises at least one of an identifier indicative of a quality of service, a cost of service, or an availability of service.

In an embodiment of the disclosure, the atomic contract comprises a chaincode associated with at least one service request item.

In an embodiment of the disclosure, the determining, by the first electronic device, of whether an atomic contract, associated with at least one second electronic device on the blockchain network, is related to the identified intent and available in the blockchain, includes mapping the at least one service request item with each atomic contract available in the blockchain and determining the at least one atomic contract that is related to the identified intent.

In an embodiment of the disclosure, the method further includes determining that the identified at least one atomic contract is associated with a whitelist of atomic contracts and a blacklist of atomic contracts, broadcasting the at least one atomic contract, the associated whitelist and the associated blacklist on the blockchain-based network and adding the at least one atomic contract, the associated whitelist and the associated blacklist to the blockchain based on a consensus mechanism in the blockchain-based network.

In an embodiment of the disclosure, the whitelist of atomic contracts is allowed to be used with the at least one atomic contract to perform the service request.

In an embodiment of the disclosure, the blacklist of atomic contracts is forbidden to be used with the at least one atomic contract to perform the transaction.

In an embodiment of the disclosure, the dynamically generating of the smart contract pipeline from the at least one atomic contract includes identifying the whitelist of atomic contracts associated with the at least one atomic contract, identifying the blacklist of atomic contracts associated with the at least one atomic contract and dynamically creating the smart contract pipeline based on the at least one validated atomic contract, the whitelist of atomic contracts and the blacklist of atomic contracts.

In an embodiment of the disclosure, the smart contract pipeline comprises a sequence of a plurality of atomic contracts bound to each other by at least one attribute of the service request.

Accordingly, the embodiments herein provide a method for managing smart contracts in a blockchain network. The method includes detecting by a first electronic device a service request in the blockchain network, determining by the first electronic device a plurality of atomic contracts related to the service request, wherein each of the atomic contracts is associated with at least one second device in the blockchain network, and transmitting, by the first electronic device, the smart contract to the at least one second electronic device.

In an embodiment of the disclosure, the identifying by the first electronic device of the at least one intent of the service request includes parsing the service request to determine at least one service request item and at least one attribute, determining a plurality of contextual parameters based on the at least one attribute and the at least one service request item, and identifying at least one intent based on the plurality of contextual parameters.

In an embodiment of the disclosure, the at least one service request item comprises at least one of an identifier of the at least one service electronic device, or an identifier indicative of a service.

In an embodiment of the disclosure, the at least one associated attribute comprises at least one of an identifier indicative of a quality of service, a cost of service, or an availability of service.

In an embodiment of the disclosure, each of the plurality of atomic contracts comprises a chaincode associated with at least one service request item.

In an embodiment of the disclosure, the method further includes determining by the first electronic device a plurality of atomic contracts related to the service request, wherein each of the atomic contract is associated with at least one second device in the blockchain network includes mapping the at least one service request item with each atomic contract available in the blockchain, and determining the at least one atomic contract that is related to the identified intent.

In an embodiment of the disclosure, the method further includes determining that the identified at least one atomic contract is associated with a whitelist of atomic contracts and a blacklist of atomic contracts, broadcasting the at least one atomic contract, the associated whitelist and the associated blacklist on the blockchain-based network and adding the at least one atomic contract, the associated whitelist and the associated blacklist to the blockchain based on a consensus mechanism in the blockchain-based network.

In accordance with an aspect of the disclosure, an electronic device for managing smart contracts in a blockchain network is provided. The electronic device includes at least one processor, a memory operationally coupled to the at least one processor, configured to store a blockchain ledger comprising a plurality of atomic contracts deployed on the blockchain network, a query parser, and a dynamic contract generator. The query parser is configured to receive a service request and identify at least one intent of the service request. The dynamic contract generator is operationally coupled to the query parser, the memory, and the at least one processor and is configured to determine whether at least one atomic contract, associated with at least one second electronic device on the blockchain network, is related to the identified intent is available in the blockchain, dynamically create a smart contract pipeline of the at least one atomic contract based on the service request, and transmit the smart contract pipeline to the at least one second electronic device.

Accordingly, the embodiments herein provide an electronic device for managing smart contracts in a blockchain network. The electronic device includes at least one processor, a memory operationally coupled to the at least one processor, configured to store a blockchain ledger comprising a plurality of atomic contracts deployed on the blockchain network, a query parser, and a dynamic contract generator. The query parser is configured to detect a service request in the blockchain network. The dynamic contract generator is operationally coupled to the query parser, the memory, and the at least one processor, and is configured to determine a plurality of atomic contracts related to the service request, wherein each of the plurality of atomic contracts is associated with at least one second device in the blockchain network, dynamically create a smart contract pipeline based on the plurality of atomic contracts associated with the at least one second device, and transmit the smart contract to the at least one second electronic device.

Other aspects, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 is a flow diagram illustrating a method for generating a smart contract pipeline, according to an embodiment of the disclosure;

FIG. 6B is a flow diagram illustrating another hierarchical path structure for atomic contracts, in accordance with an embodiment of the disclosure;

FIG. 14 is another example scenario for deploying a smart contract pipeline based on a service request, according to an embodiment of the disclosure.

Throughout the drawings, like reference numerals will be understood to refer to like parts, components, and structures.

DETAILED DESCRIPTION

Figure 1A:
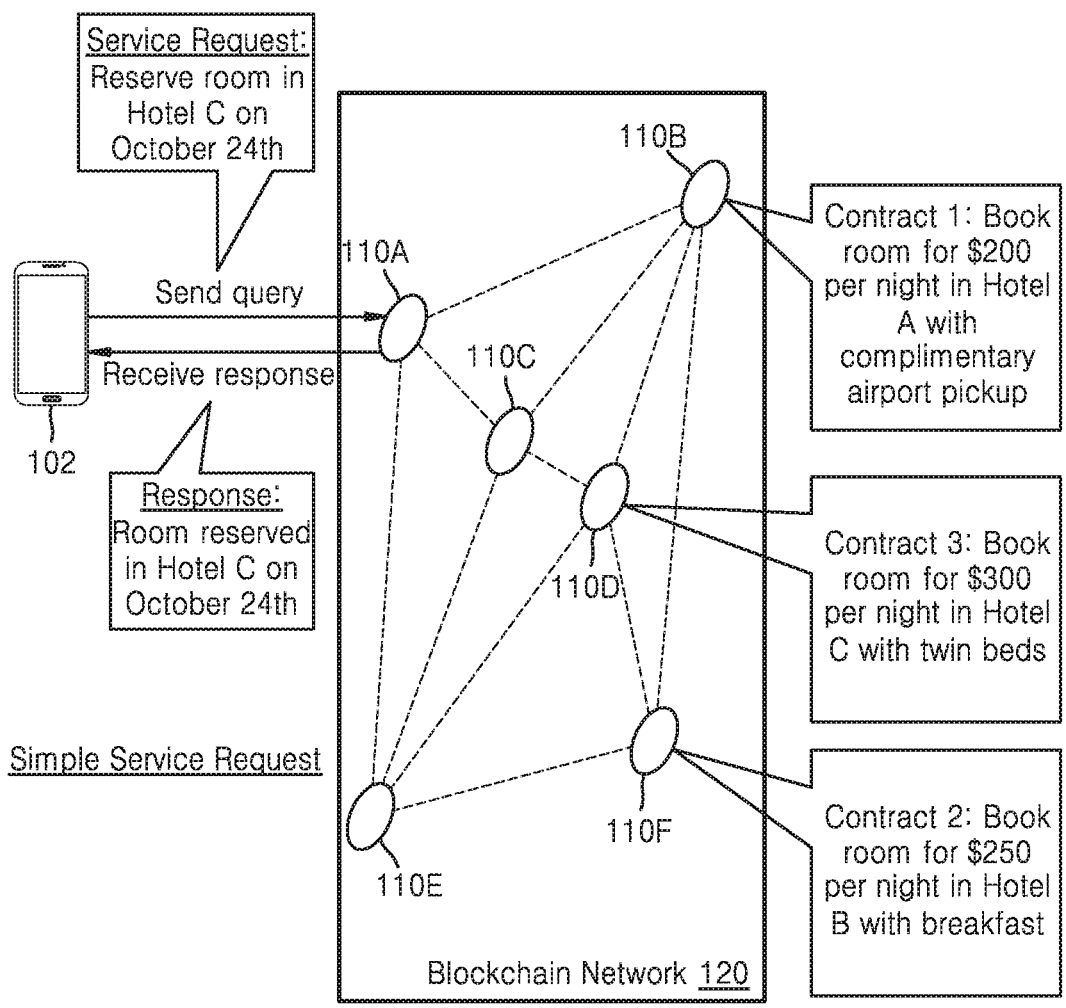
FIGS. 1A, 1B, and 1C illustrate flow diagrams relating to an execution of simple contracts in a blockchain network, according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions are be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Also, the various embodiments described herein are not necessarily mutually exclusive, as some embodiments can be combined with one or more other embodiments to form new embodiments. Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, engines, controllers, units or modules or the like, are physically implemented by analog and/or digital circuits such as logic gates, integrated circuits, microprocessors, microcontrollers, memory circuits, passive electronic components, active electronic components, optical components, hardwired circuits, and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Referring now to the drawings, and more particularly to FIGS. 1A through 14, where similar reference characters denote corresponding features consistently throughout the figures, there are shown preferred embodiments.

The disclosure relates to smart contracts technology describing methods that involve gaining verification and approval from all stakeholders in the blockchain network. The smart contract is a sort of a programmatic code deployed over the blockchain network. The smart contract is used to provide controlled access to share ledger, query and trigger new transactions among the participants of the blockchain network. The participants of the blockchain network may be also called as stakeholders of the blockchain network. The smart contract is validated, verified and deployed by blockchain stakeholders during the consensus process among the stakeholders of the blockchain network according to the blockchain principle. In general, the smart contract needs verification and approval from all stakeholders of the blockchain network before being deployed over the blockchain network. In addition, the smart contract cannot be altered once deployed over the blockchain network, and thus the smart contract is protected. Once the smart contract is deployed over the blockchain network, the smart contract is available for use and execution by any authorized stakeholder of the blockchain network.

Figure 1B:
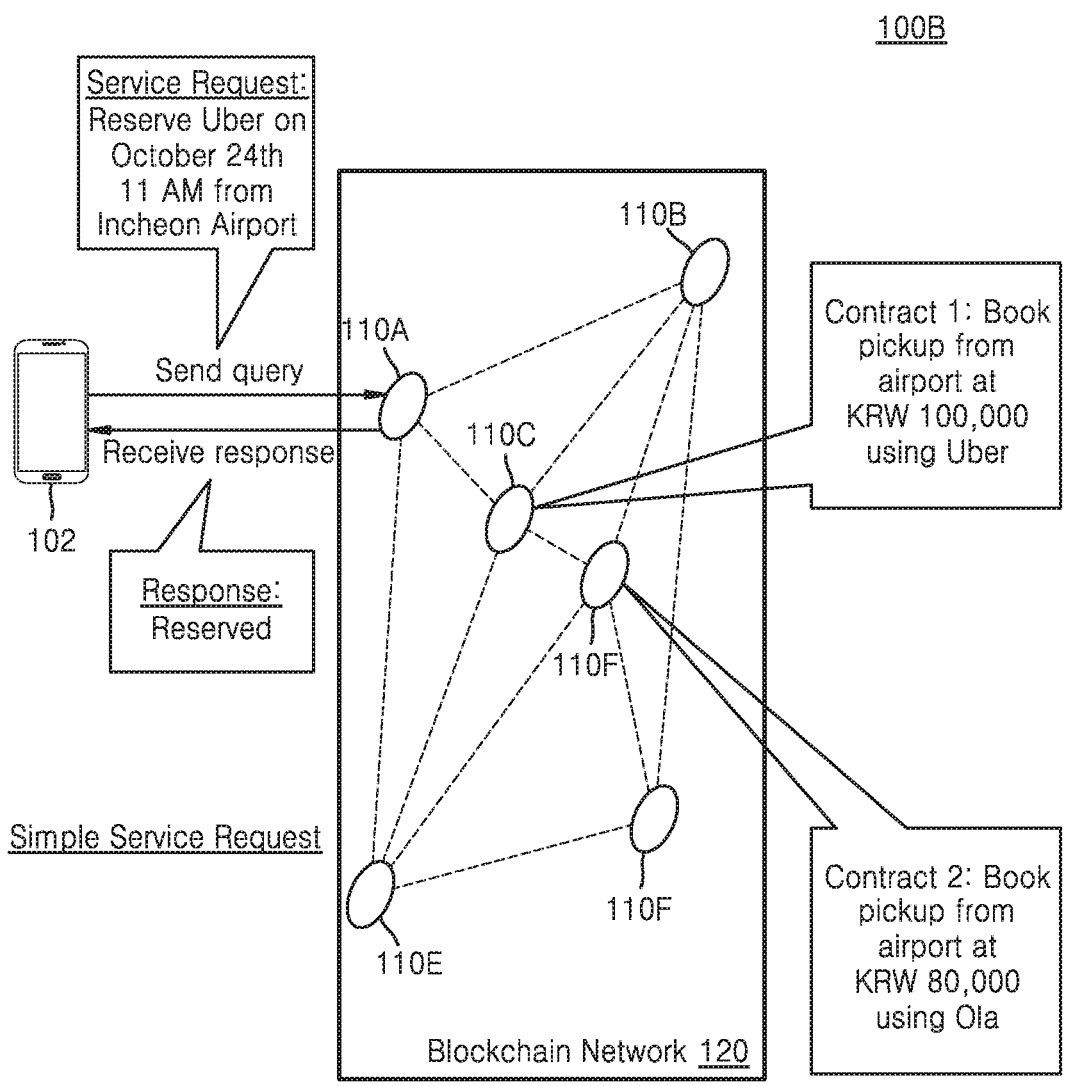
Figure 1C:
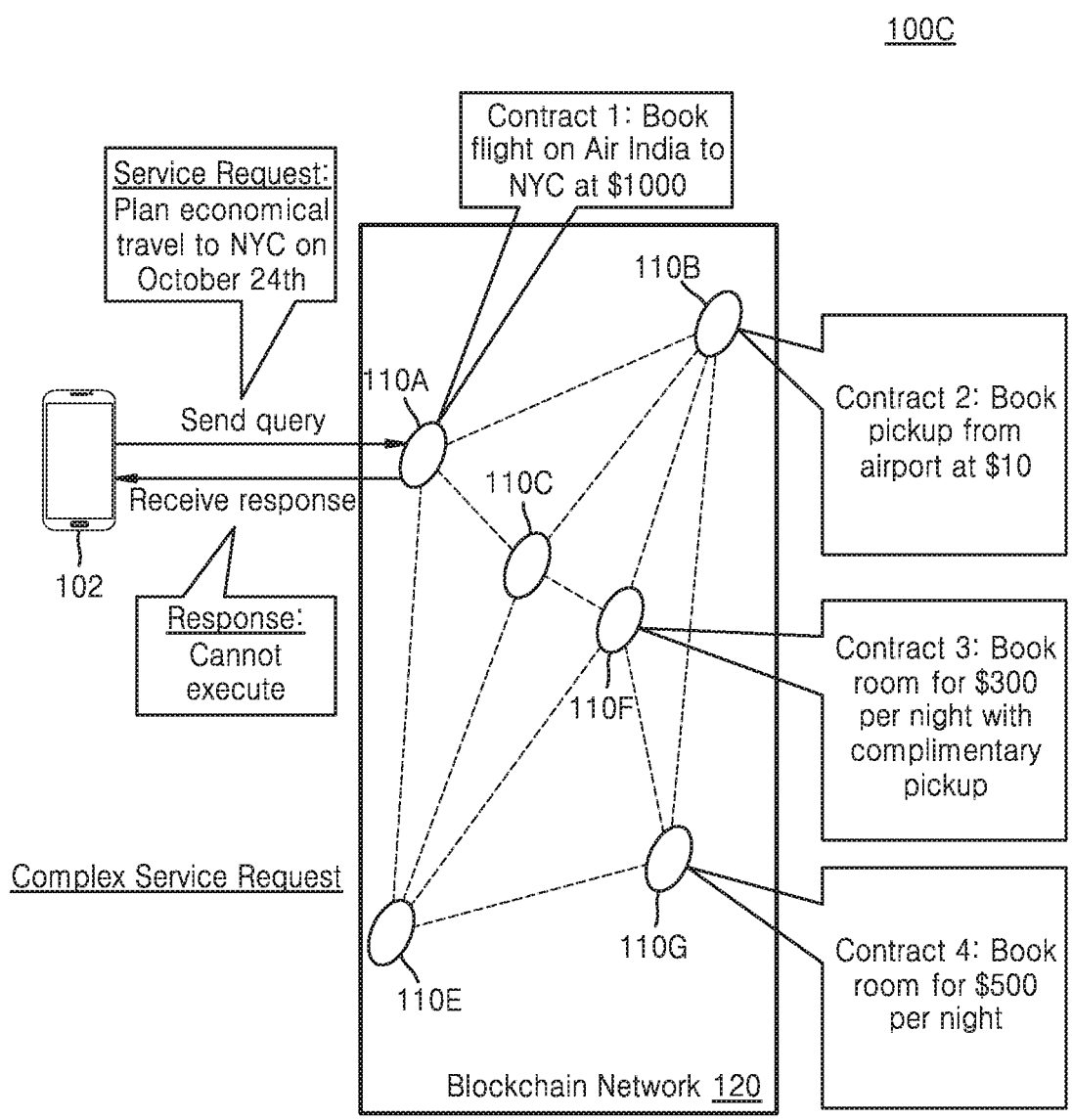

FIGS. 1A, 1B, and 1C illustrate various flow diagrams 100A, 100B, and 100C relating to an execution of smart contracts in a blockchain network according to various embodiments of the disclosure. In all three examples shown in FIGS. 1A, 1B, and 1C, a query for a transaction is received by an electronic device 102 in a blockchain network 120 with nodes 110A, 110B, 110C, 110D, 110E, and 110F. Each node represents a stakeholder in the blockchain network 120 such as, but not limited to, a hotel, a hotel booking service, a cab booking service and the like.

Referring to FIG. 1A, a user who wants to visit a city sends a query for a transaction to book accommodation in a hotel. Most users utilize a smartphone for sending queries to book accommodation in a hotel. Blockchain mechanisms can cater to simple queries such as to book accommodation in a specific hotel. The user provides the service request or query through an electronic device such as a desktop computer, a laptop computer, a tablet, a phablet or a smartphone. For example, a user of a smartphone transmits the request across a blockchain network to find a contract relating to booking accommodation in the hotel specified in the service request. The service request may be provided as a voice request or a text-based request through the smartphone. As shown in FIG. 1A, the node 110B has a contract 1 enabling a user to book a room for $200 per night in Hotel A with complimentary airport pickup, the node 110F provides a contract 2 enabling the user to book a room for $250 per night in Hotel B with free continental breakfast, and the node 110D provides a contract 3 enabling the user to book a room for $300 per night in Hotel C with twin beds. The contracts 1, 2, and 3 may be called 'atomic contracts' correspond to the service request. Accordingly, a hotel associated with the identified contract is booked on behalf of the user, and a response indicative of confirmed booking is relayed to the electronic device 102.

Referring to FIG. 1B, a service request to reserve a cab using Uber booking service is transmitted. In response, an atomic contract related to Uber booking service and another atomic contract related to Ola booking service are found, and the Uber booking is selected based on the user request containing "Uber." A response indicative of the confirmed booking is relayed to the electronic device 102.

In a blockchain query processing, a system may answer only the vendor-defined contracts. The answer only with the vendor-defined contracts limits the possibilities of total query processing. Users often use comparative operators when multiple options are available such as "What is cheaper to Commute?" In the event of a complex query or a service request such as the example shown in FIG. 1C, where the query is directed to plan an economical travel to New York City on October 24th, there is no single contract on the blockchain network 120 that can satisfy all the items included in the query. Items such as "travel" can entail multiple segments such as but not limited to booking flights from the home city to New York City, booking accommodation in New York City, booking pickups from the airport in New York City, booking travel options within New York City, etc. Thus, a single atomic contract may not cover the entire set of potential services requested through the query. Conventionally, such complex request may be broken down into separate, multiple requests such as "booking flight to New York City", "booking a hotel in New York City," and "booking a taxi from New York Airport on October 24th," etc. Accordingly, each service request is catered to by finding appropriate contracts for the same on the blockchain network 120.

Therefore, there is a need for infrastructure that caters to complex service requests. Using the same example as above, a complex service request specifying booking accommodation in a particular hotel on a particular day along with booking a cab to the hotel requires multiple contracts on the blockchain network to be identified. A plurality of atomic contracts needs to be integrated into one smart contract seamlessly to meet complex service request.

FIG. 2 is a flow diagram illustrating a method for generating a smart contract pipeline according to an embodiment of the disclosure. Throughout the specification, the term of "a smart contract pipeline" may be used interchangeably with the term of "a new smart contract," "dynamic (new smart) contract" or "a new smart contract." The smart contract pipeline may be a contract including a group of atomic contracts each of which is related to at least one partial request included in a complex service request. Referring to FIG. 2, a smart contract entity 200 can be an enterprise server that provides atomic contracts based on business terms and business contracts between owners of the smart contract entity 200 and/or various stakeholders 220A to 220N or second electronic devices 220A to 220N of the blockchain network 210 at operation 1. The stakeholders 220A to 220N (hereinafter referred to as the stakeholders 220) can be any electronic device representative of a service entity such as but not limited to a food delivery service, a cab service (such as Uber, Lyft, etc.), hotel accommodation services, flight booking services and the like. In some embodiment, the stakeholders 220 may also provide the atomic contract related to services which each of the stakeholders can provide. Any new stakeholder can join the blockchain network 210 upon execution of a consensus mechanism. Requests for services pertaining to the service entity are received at the respective stakeholders. Business contracts are implemented upon finalization of features such as but not limited to check availability, place an order, check delivery time. At operation 2, each finalized feature is developed as an atomic contract. Simple atomic contracts, such as but not limited to PlaceOrder relating to placing an order of certain service, GetWaitingTime relating to estimated time for providing certain service, GetRating relating to the quality of certain service and the like are first agreed to and deployed by the stakeholders 220.

Each atomic contract is deployed with an associated whitelist and blacklist of other contracts that it is compatible with. The blacklist means a list specifying other atomic contracts which cannot be used with this contract (the contract associated with the blacklist) and the whitelist means a list specifying other atomic contracts which can be used with this contract (the contract associated with the whitelist). For example, Uber may be willing to compare waiting times with Lyft but not the pricing. In general, atomic contracts and the blacklist/whitelist associated with each atomic contract are announced on the blockchain network. In addition, atomic contracts and the blacklist and whitelist associated with each atomic contract are approved/verified by consensus mechanism on the blockchain network and added to the blockchain network upon the approval.

At operation 3, the atomic contracts with chaincode indicative of the finalized feature are deployed on the blockchain network 210. The deployed atomic contracts are verified and approved by the corresponding stakeholders 220. New atomic contracts are deployed over the blockchain network 210 upon consensus between all stakeholders 220 operations 4 through 6.

At operation 7, a user provides a query or a service request to an electronic device 102. The electronic device 102 can be but not limited to a smartphone, a tablet computer, a laptop computer, a desktop computer and the like. The query can be any of a voice query or a text query. In some embodiments, the electronic device 102 can include voice sensors such as a microphone that detects the voice query.

Referring FIG. 2, the electronic device 102 may transmit the detected voice query to a smart contract entity 200. At operation 8, the smart contract entity 200 identifies required atomic contracts to be executed over the blockchain network 210 to process the query from the electronic device 102. Subsequently, operations and attributes among the identified atomic contracts are further determined. In some embodiments, the electronic device 102 identifies the required atomic contracts and related operations and attributes. The electronic device 102 or the first electronic device receives a service request from the user. Based on the stakeholders available on the blockchain network 210, atomic contracts appropriate to the query from the user and associated at least one of the stakeholders 220 are identified. Each atomic contract is combined with each other based on identified attributes and operations from the user query to form a smart contract pipeline.

For example, for the user query presented in FIG. 2, atomic contracts relating to delivery of apples by a specific day are required. Accordingly, atomic contracts with stakeholders that sell apples and delivery services that can deliver to the user's location by the specified date are found. A smart contract pipeline with atomic contracts relating to apple sellers and a delivery service that can deliver to the user by the specified date is dynamically generated and broadcast over the blockchain network 210. In some embodiments, if a specific delivery service or a delivery service regularly used by the user is unavailable, alternate stakeholders and related atomic contracts are used to generate an alternative smart contract pipeline. At step 9, the smart contract pipeline is further deployed over the blockchain network to provide the requested services to the user. Any smart contract pipeline already generated is automatically deployed over the blockchain network 210.

In some embodiments, each atomic contract is deployed with an optional blacklist and whitelist. These lists are mutually exclusive and contain a number of atomic contract paths that may or may not be combined with the current atomic contract, to handle new user queries. Whitelists and blacklists allow blockchain participants, i.e. the stakeholders 220 to control their end-user use cases as per respective business policies. An atomic contract pipeline satisfying all blacklist-whitelist requirements of involved atomic contracts is automatically deployed on a blockchain network, hence bypassing the need for contract verification and enabling handling of real-time complex queries.

Figure 3:
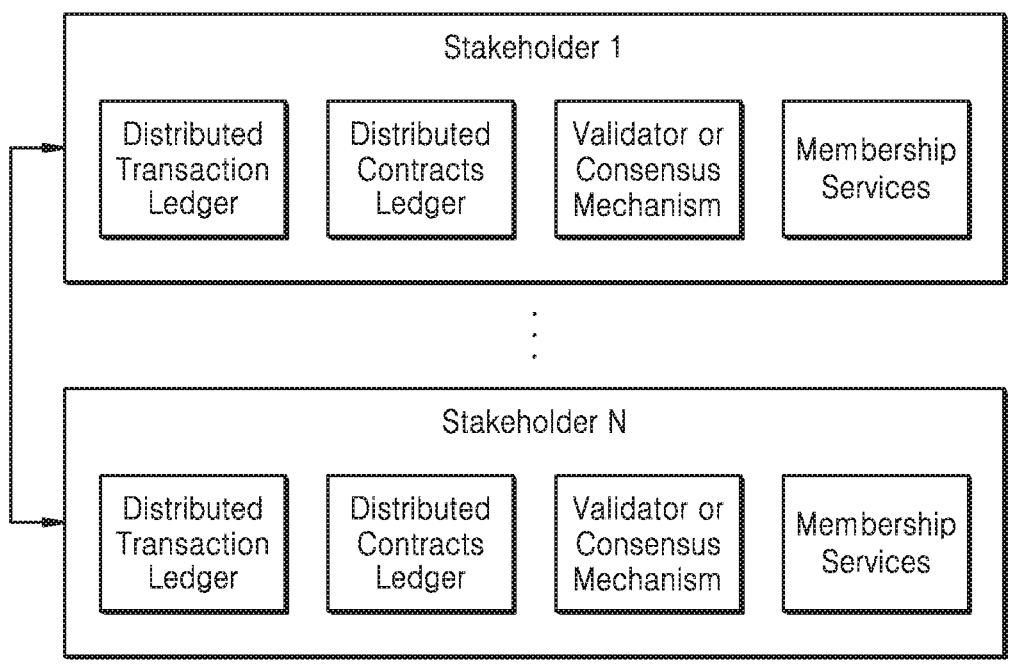
FIG. 3 illustrates a blockchain infrastructure network, according to an embodiment of the disclosure.

FIG. 3 illustrates the blockchain infrastructure network 210 according to an embodiment of the disclosure. Referring to FIG. 3, the blockchain network 210 is a sequence of transaction blocks of users. Data in any of the blocks of the blockchain can be changed only by altering the data stored in each of the subsequent blocks in the blockchain. Transaction data is added through consensus protocols tolerating Crash failures or Byzantine failures. Users and stakeholders associated with various services can be registered on the blockchain network 210.

Figure 4:
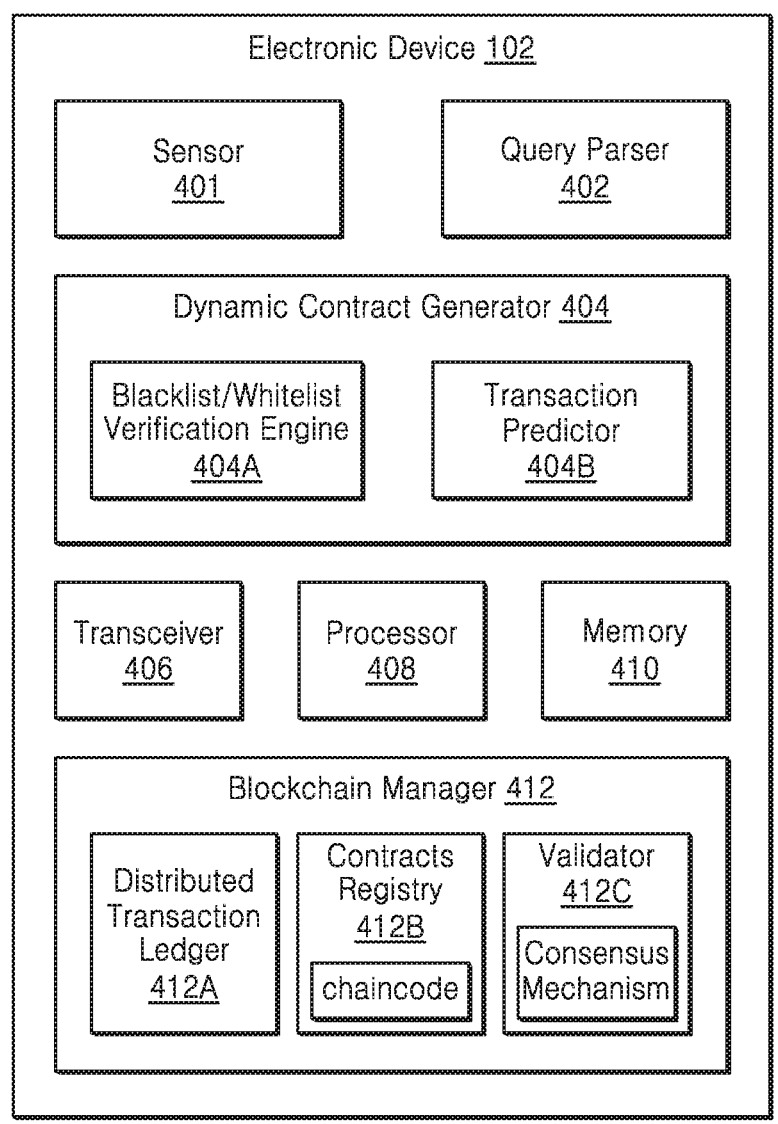
FIG. 4 illustrates hardware components of an electronic device for deployment of a service request and smart contract pipeline in a blockchain network, according to an embodiment of the disclosure.

FIG. 4 is a block diagram of the electronic device 102 with a sensor 401, a query parser 402, a dynamic contract generator 404, a transceiver 406, a processor 408 and a memory 410 according to an embodiment of the disclosure.

Referring to FIG. 4, the sensor 401, the query parser 402, the dynamic contract generator 404 and a transceiver 406 may be communicably coupled to the processor 408 and the memory 410. The dynamic contract generator 404 includes a blacklist/whitelist verification engine 404A and a transaction predictor 404B. The query parser 402 receives a user query and segregates the user query into multiple intentions. In another embodiment, the query parser 402, the dynamic contract generator 404, the processor 408, and the blockchain manager 412 can be implemented as at least one hardware processor. The blockchain manager 412 may include a distributed transaction ledger 412A, a contracts registry 412B (e.g., chaincode), and a validator 412C (e.g., consensus mechanism).

The processor 408 may be, but not restricted to, a central processing unit (CPU), a microprocessor, or a microcontroller. The processor 408 is coupled to the memory 410. The processor 408 executes sets of instructions stored on the memory 410. Any generated dynamic contracts or contract pipelines are stored in the memory 410.

The memory 410 includes storage locations to be addressable through the processor 408. The memory 410 is not limited to a volatile memory and/or a non-volatile memory. Further, the memory 410 can include one or more computer-readable storage media. The memory 410 can include non-volatile storage elements. For example, non-volatile storage elements can include magnetic hard discs, optical discs, floppy discs, flash memories, or forms of electrically programmable memories (EPROM) or electrically erasable and programmable (EEPROM) memories. The embodiments disclosed herein can be implemented through at least one software program running on at least one hardware device and performing network management functions to control the elements.

The transceiver 406 can be any communication unit or module that enables connectivity with a second electronic device on the blockchain network 210.

The query parser 402, the dynamic contract generator 404, the transceiver 406, the processor 408 and the blockchain manager 412 can be any processing unit or a chipset in the electronic device 102.

In some embodiments, the query parser 402 is coupled to the sensor 401 in the electronic device 400. The sensor 401 can be a voice sensor such as a microphone or any voice input receiver that captures voice queries from the user. The query parser 402 may receive the user query as a service request and identify one or more intents extracted from the service request. For example, the service request can be a request to book a hotel in New York during December in 2018. Accordingly, a statement included the service request is parsed by the query parser 402 to distinguish between the various service request items and attributes in the service request. A plurality of contextual parameters based on the attributes and the service request items are identified or determined. Based on the identified plurality of contextual parameters, user intents are also identified. In the current example, the query parser 402 may identify that the user intends to travel to New York in December 2018 and would like to book accommodation based on the contextual parameters extracted from a statement included in the service request, for example, "I want to travel to New York city in December and to book a hotel there." Accordingly, atomic contracts relating to travel options to New York in December 2018, atomic contracts relating to hotel accommodation in New York in December 2018, atomic contracts relating to commuting to airports or railway stations in New York and the departure (origin) city can be identified on the blockchain network 210. The departure city of the user may be identified by, for example, a GPS implemented on the electronic device of the user.

Contextual parameters (keywords) are directed to the identification of keywords such as "book," "hotel," "travel," etc. in the example as mentioned above. In another example, for a service request relating to ordering and delivering food, contextual parameters can be directed to terms of food, various cuisines, popular food delivery services that are stakeholders on the blockchain network 210. In some embodiments, the query parser 402 may use techniques of deep learning or machine learning to identify the intentions in a service request accurately.

The blacklist/whitelist verification engine 404A may determine whether an atomic contract associated with an electronic device of a stakeholder on the blockchain network 210 is related to the identified intent. Accordingly, the transaction predictor 404B may identify the whitelist and blacklist of atomic contracts related to the atomic contract identified by the blacklist/whitelist verification engine 404A. For example, if an atomic contract pertaining to food delivery from a restaurant is identified by the query parser 402, the transaction predictor 404B identifies various delivery service options for the food to be delivered to the user. A whitelist and blacklist of contracts related to the atomic contract are determined based on the service agreements between various stakeholders. For example, some delivery services may not have a contract in place to cater to delivering food from the restaurant identified by the query parser 402. In another example, some delivery services may not cater to delivery orders in the location of the user. In such cases, the delivery service stakeholders are categorized in the blacklist of contracts for the identified atomic contract. Based on the blacklist and whitelist of contracts, a smart contract pipeline is generated by the transaction predictor 404B. The generated smart contract pipeline is automatically deployed or broadcast over the blockchain network 210. The new smart contract generated according to the foregoing is added to the blockchain network 210 upon consensus among all stakeholders—participants of the blockchain network.

In some embodiments, if an atomic contract associated requested service is not available, the user can be redirected to alternate services. For example, if a user provides a service request for booking an Uber taxi service and it is determined that the atomic contract for Uber is unavailable on the blockchain network 210, an atomic contract for an alternative service such as Lyft or a self-driving service such as Hertz may be identified over the blockchain network 210 and provided to the user on the electronic device 102. In some other embodiments, alternative services can be offered if a requested service is available but failed to execute due to runtime issues or network connectivity issues. The alternative atomic contract replacing the atomic contract associated with the requested service is identified on various occasions. For example, in case the keyword 'Uber' is detected and it is found that the Uber service is not available, the alternative Lyft service instead of the Uber service will be included in the smart contract pipeline. In another example, in case the attribute of 'within 10 minutes' is detected among the statement of "Pizza delivery service within 10 minutes" included in the service request and it is determined that no atomic contract relating to Pizza delivery service within 10 minutes is available, the alternative Pizza delivery service within 30 minutes can be offered and can be added to the smart contract pipeline.

Figure 5:
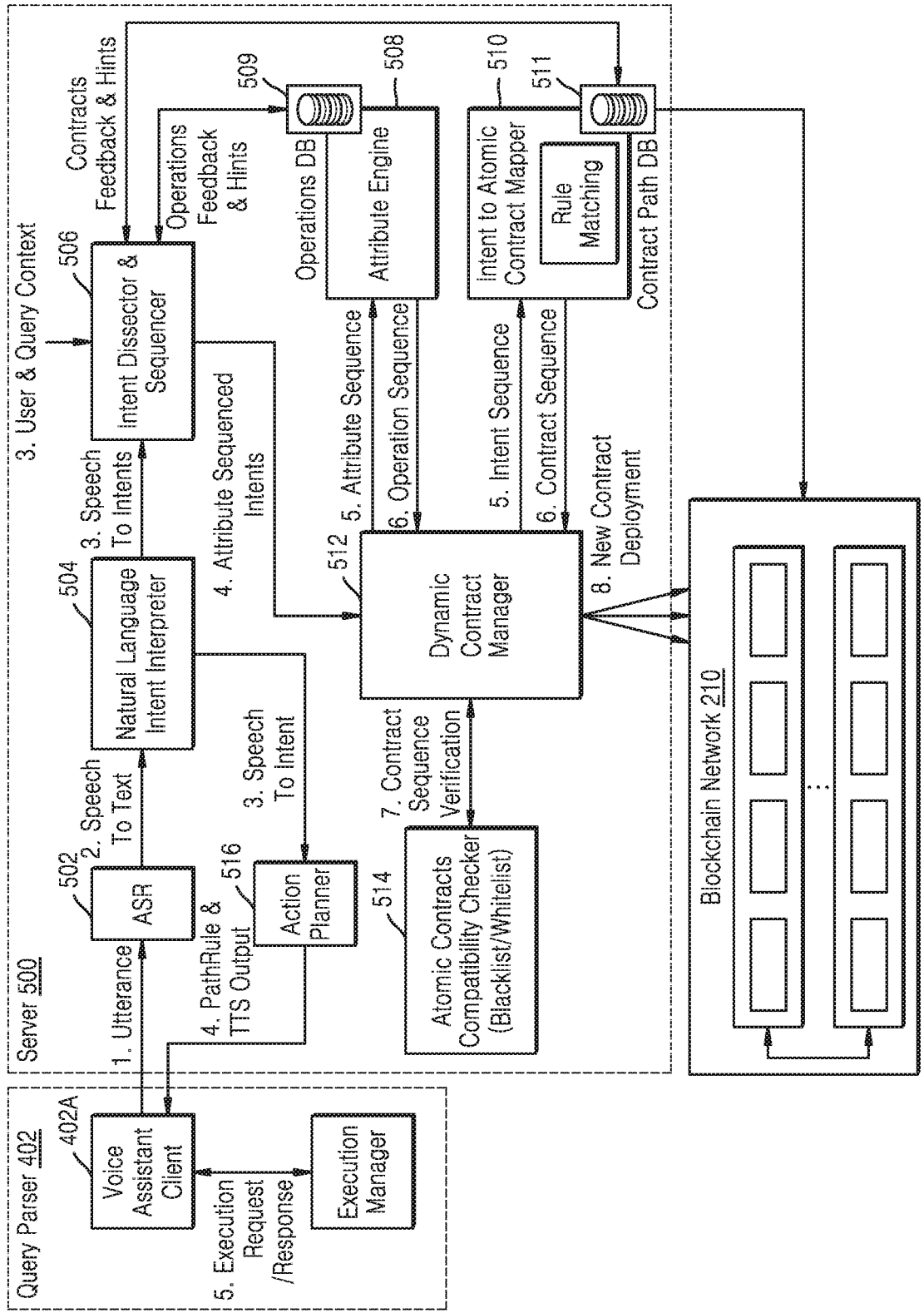
FIG. 5 is a flow diagram illustrating the mapping of atomic contracts with the service request, according to an embodiment of the disclosure.

FIG. 5 is a flow diagram illustrating the mapping of atomic contracts with the service request according to an embodiment of the disclosure.

Referring to FIG. 5, the user query is parsed by the query parser (e.g., via a voice assistant client 402A) and transmitted to a server 500. An audio-speech recognizer (ASR) 502 may recognize an audio input by a user and extract texts from the audio input. Next, a natural language intent interpreter 504 may further identify keywords from the extracted texts. An intent dissector and sequencer 506 may further determine the user's intents based on the identified keywords. Any dynamic user requirement identified from the user's intents is then parsed and broken down into a set of corresponding atomic contracts and related attributes or operations between them. The attributes engine 508 may specifically determine the attributes related to the parsed dynamic user requirement. An operations database 509 may store various operations or atomic contracts deployed over the blockchain network 210 in connection with the identified user's intents. Similarly, a contract path database 511 may store various contract paths, atomic contracts to be executed over the blockchain network 210. Based on the identified user's intent, service request items and/or attributes mapped to one or more atomic contracts using the attributes engine 508 and intent to atomic contract mapper 510. Mapping is done based on various rules such as matching of keywords.

A dynamic contract manager 512 may generate a smart contract pipeline or a new smart contract comprising a group of atomic contracts selected using the mapping. The smart contract pipeline is created with identified atomic contracts and operations by putting them in sequence, parallel or hybrid combinations based on the nature of user query. The smart contract pipeline is further generated by analyzing the atomic contracts compatible in connection with blacklists and whitelists by the atomic contracts compatibility checker 514. Every involved whitelist/blacklist associated with an atomic contract is taken into consideration before generating the smart contract pipeline. Any new smart contract may be added to the blockchain network 210 upon consensus among the stakeholders of the blockchain network 210. Atomic contracts are further filtered in accordance with blacklist and whitelist of atomic contracts by the atomic contracts compatibility checker 514. This smart contract pipeline is then deployed as a complex smart contract which is immediately auto-verified, hence enabling blockchain infra to handle near real-time queries. In accordance with the deployed smart contracts in the blockchain network 210, an action planner 516 may further provide a response to the user query through the electronic device 400.

Figure 6A:
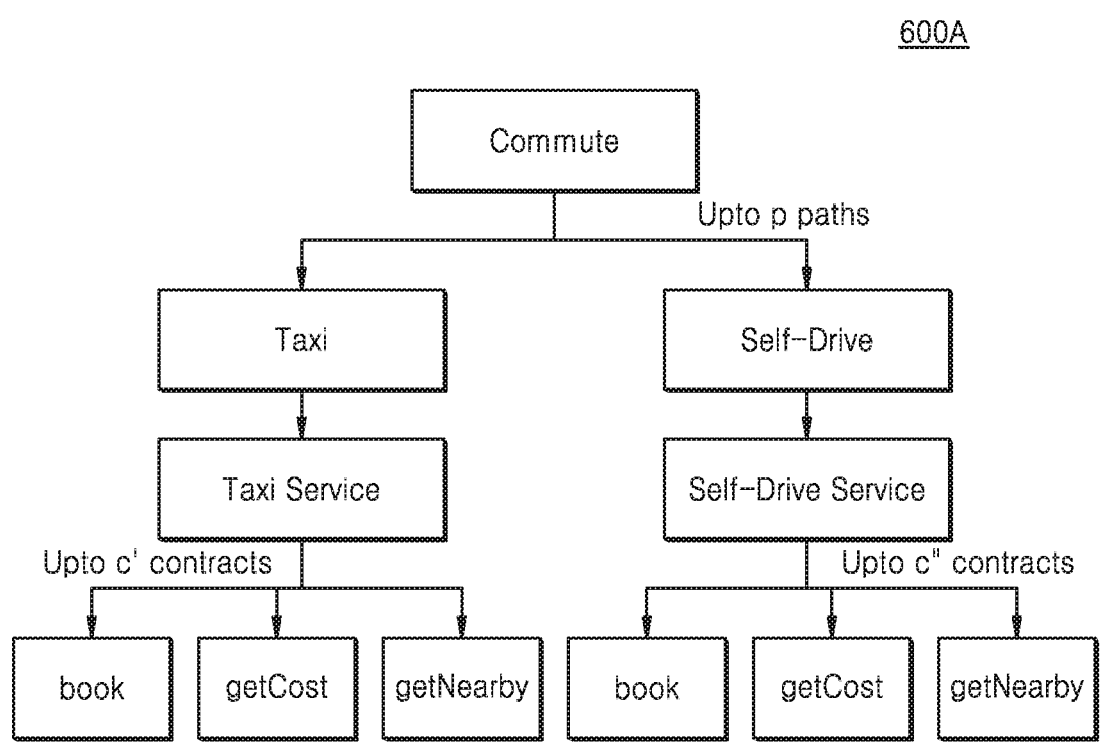
FIG. 6A is a flow diagram illustrating a hierarchical path structure for atomic contracts, in accordance with an embodiment of the disclosure.

FIG. 6A is a flow diagram 600A illustrating a hierarchical path structure for atomic contracts, according to an embodiment of the disclosure. A user provides a query for commuting options, for which there can be "p" different options such as options for a taxi, self-driving option and the like. Within each of the "p" options, there could be multiple characteristics for each option. For example, to select a self-driving driving option, various attributes such as but not limited to, cost of commute (price), quality of service, nearest (distance) available self-driving and the like. In a blockchain-based architecture, atomic contracts associated with each of the aforementioned attributes are deployed by various stakeholders. Each atomic contract is deployed with an associated whitelist and blacklist of contracts compatible with the atomic contract. A blacklist of atomic contracts specifies atomic contracts that cannot be used with the deployed atomic contract. A whitelist of atomic contracts specifies atomic contracts that can be used with the deployed atomic contract.

The query of the user is parsed and intents from the user query are determined thereby. Based on the determined intents, a set of deployed atomic contracts and operations between them are identified over the blockchain network. A dynamic smart pipeline with identified atomic contracts and operations is generated.

In some embodiments, the user query is segregated into a group of atomic contracts and attributes between them. Complex contract pipelines are created using approved atomic contracts and their associated blacklists and whitelists available in the blockchain network. Atomic contracts are combined using attributes in many possible ways such that any service request from the user to the electronic device 102 can be catered to.

FIG. 6B is a flow diagram 600B illustrating a hierarchical path structure for atomic contracts according to an embodiment of the disclosure.

Referring to FIG. 6B, various services can be organized in a hierarchical manner. Services can be categorized by types such as travel services or food delivery services (restaurants). The types may be determined based on, for example, the parsing result of the statement included in the service request. In other words, the types may be determined based on attributes or service request item extracted by parsing the statement included in the service request. Travel services are further categorized into air travel services and road travel services. Travel by road is further categorized into taxi services and bus services. Taxi services are further categorized based on the services offered or deployed on the blockchain network 210. In the current example, Uber and Lyft services are available as taxi services. A service request for booking an Uber service automatically finds the atomic contract related to booking an Uber taxi in the hierarchical path structure.

Figure 6C:
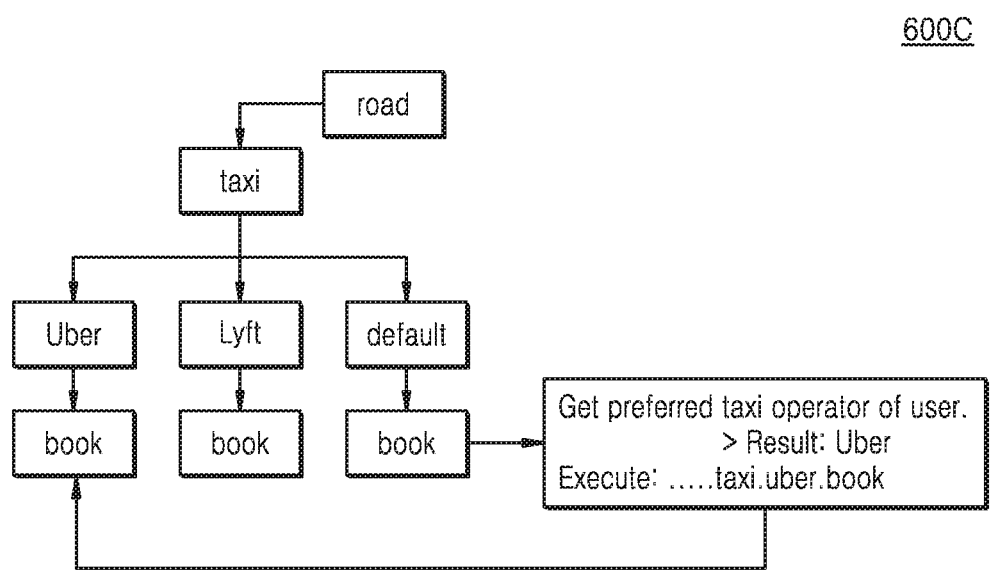
FIG. 6C is a flow diagram illustrating a hierarchical path structure with a default path, in accordance with an embodiment of the disclosure.

FIG. 6C is a flow diagram 600C illustrating a hierarchical path structure with a default path according to an embodiment of the disclosure.

Referring to FIG. 6C, a default atomic contract could be included in the contract paths hierarchy to handle default scenarios. For example, a user query could be: "Get me Italian food", "Get me a Taxi," etc. where user context or history could be leveraged to execute a use case. With a query as "Get me a Taxi" provides ambiguous and multiple paths. As shown in FIG. 6C, a default atomic contract is selected that would get user context (preferred taxi operator) and execute the relevant atomic contracts.

Figure 7A:
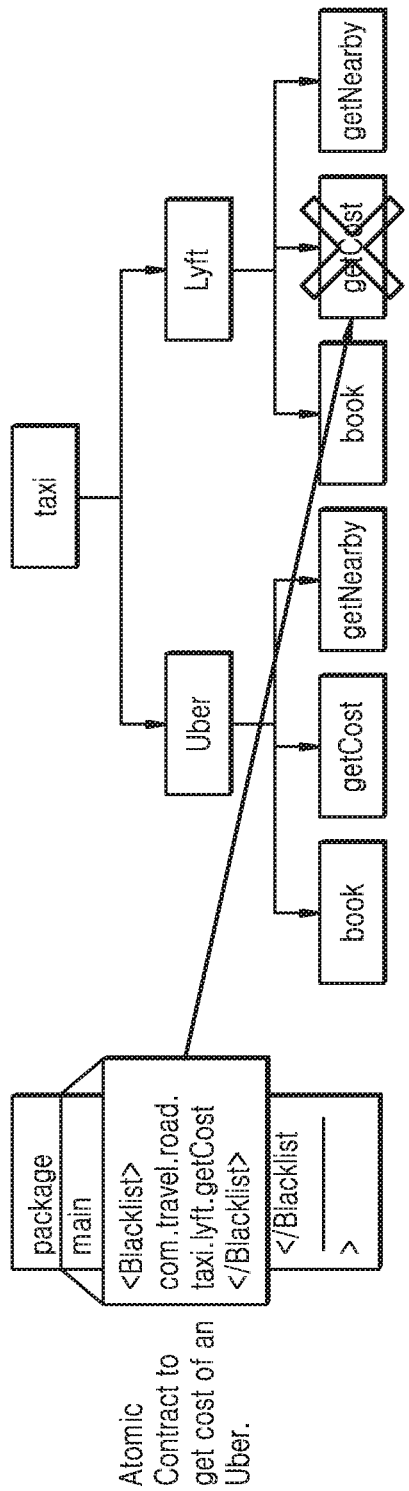
FIGS. 7A and 7B are flow diagrams illustrating the deployment of a whitelist and blacklist along with an atomic contract in the blockchain network, according to various embodiments of the disclosure.
Figure 7B:
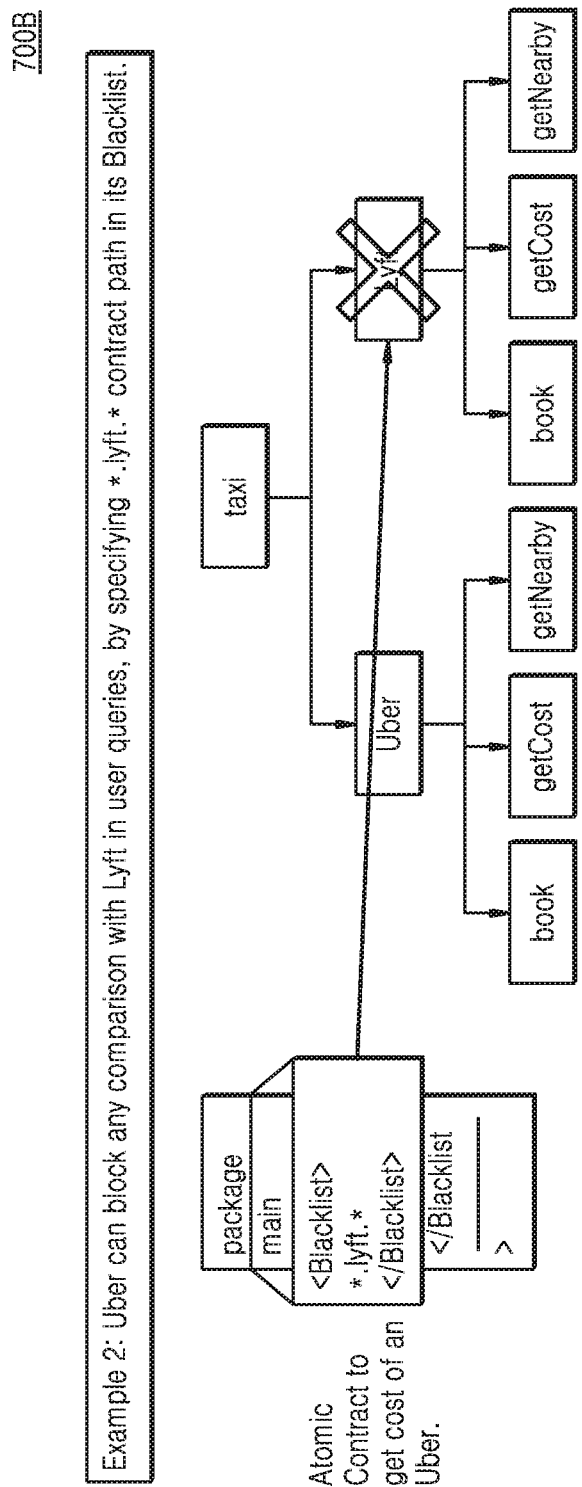

FIGS. 7A and 7B are flow diagrams 700A and 700B illustrating the deployment of a whitelist and a blacklist along with an atomic contract in the blockchain network 210 according to an embodiment of the disclosure. Each Atomic Contract can be deployed with an optional blacklist and whitelist. These lists are mutually exclusive and contain at least one atomic contract paths or at least one atomic contract that may or may not be combined with the current atomic contract, to handle new service requests.

Referring to FIG. 7A, the contracts with Lyft are contained on a blacklist related to atomic contracts with Uber. A service request for an Uber service blocks cost comparison with Lyft by specifying the getCost contract for Lyft in the blacklist for Uber. On the other hand, a cost comparison with Lyft is possible if the Lyft contract is included in a whitelist associated with the atomic contract for Uber.

Referring to FIG. 7B, any kind of comparison between Uber and Lyft are blocked by specifying Lyft in the blacklist for Uber.

Figure 8:
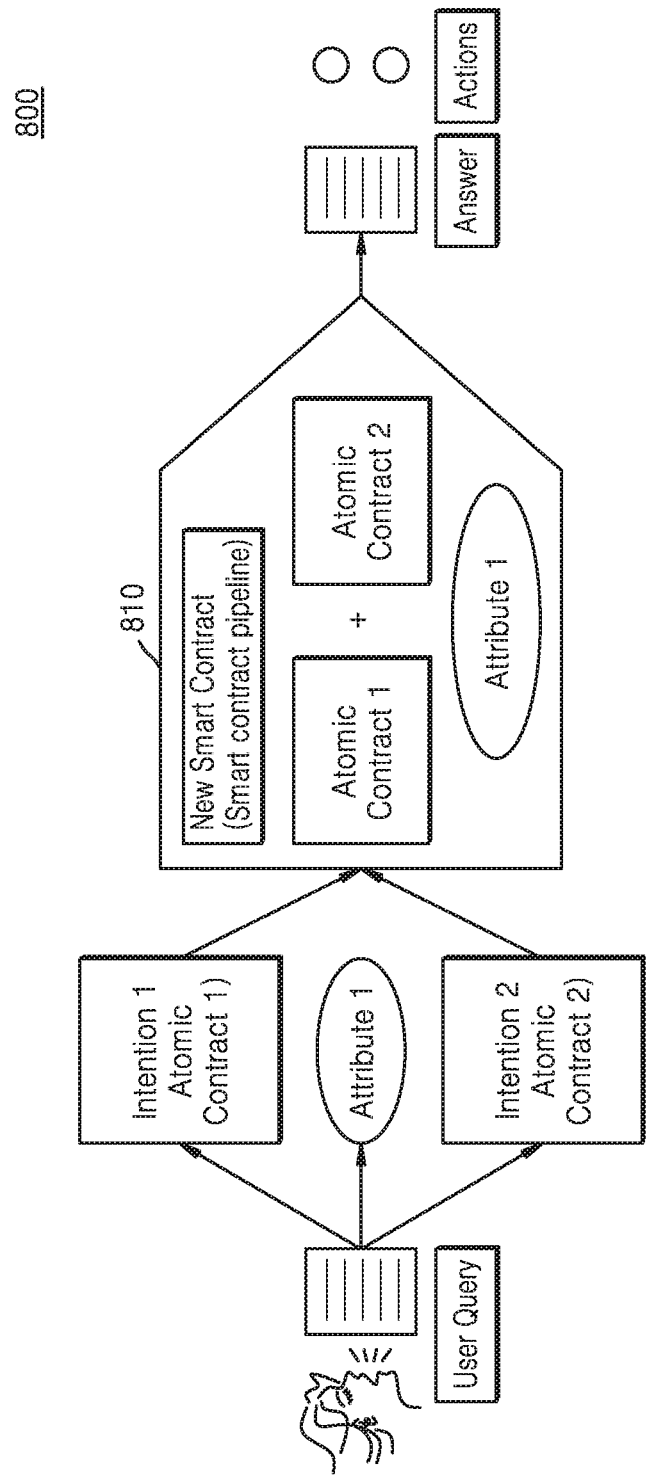
FIG. 8 illustrates a smart contract pipeline, according to an embodiment of the disclosure.

FIG. 8 illustrates the smart contract pipeline 800, according to an embodiment of the disclosure.

Referring to FIG. 8, the electronic device 102 receives a user query from which multiple intentions and attributes are identified by the query parser 402 (shown in FIG. 4). Each intention may be mapped to an atomic contract available in the blockchain network 210 (shown in FIG. 2 and FIG. 3). The new smart contract 810 is generated based on the blacklist and whitelist associated with identified atomic contracts. The new smart contract 810 may include a sequence of atomic contracts bound to each other by the identified attributes and intentions identified from the service request and user query.

Figure 9:
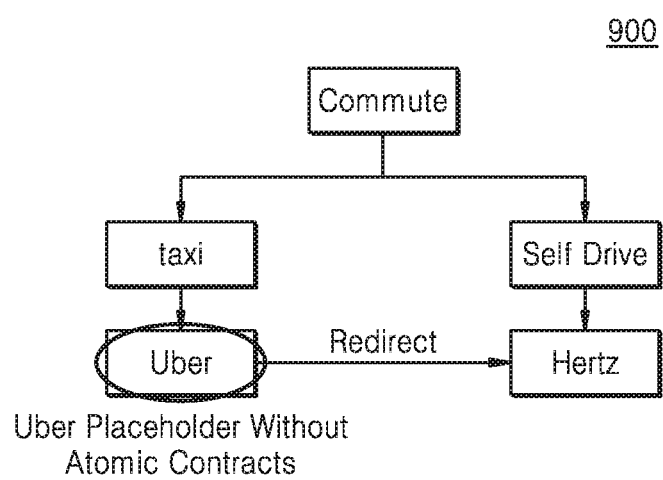
FIG. 9 and FIG. 10 are hierarchical diagrams of atomic contracts deployed over the blockchain network, according to various embodiments of the disclosure.
Figure 10:
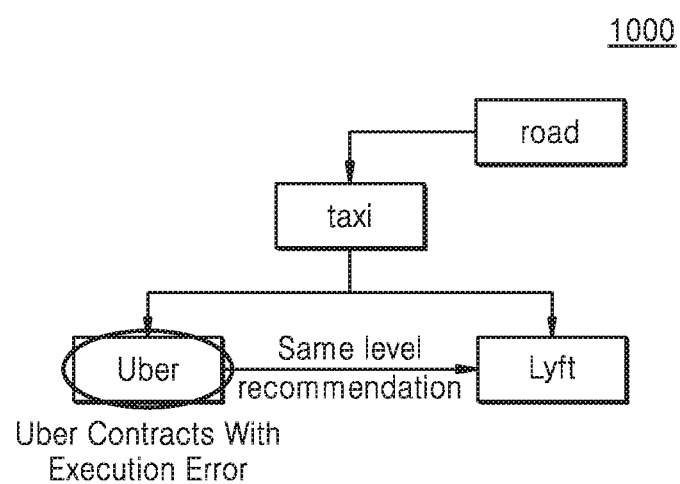

FIG. 9 and FIG. 10 are hierarchical diagrams 900 and 1000 of atomic contracts deployed over the blockchain network 210 according to an embodiment of the disclosure.

In a scenario where a requested service is unavailable on the blockchain network, an alternative service may be recommended to the user. The alternative service related to an atomic contract is one that is selected at the same hierarchical level as the requested service related to another atomic contract.

Referring to FIG. 9, a service request is provided for an Uber ride. Placeholders can be put for missing use cases which redirect to alternative use-cases. In this case, the Uber placeholder can redirect to Self-Drive service provided by Hertz.

Referring to FIG. 10, in case a requested service is unavailable due to runtime issues, alternate services can be recommended at the same level of a hierarchy. In FIG. 10, Uber services fail to execute and alternately the user is recommended to use Lyft services on the electronic device 102.

Figure 11:
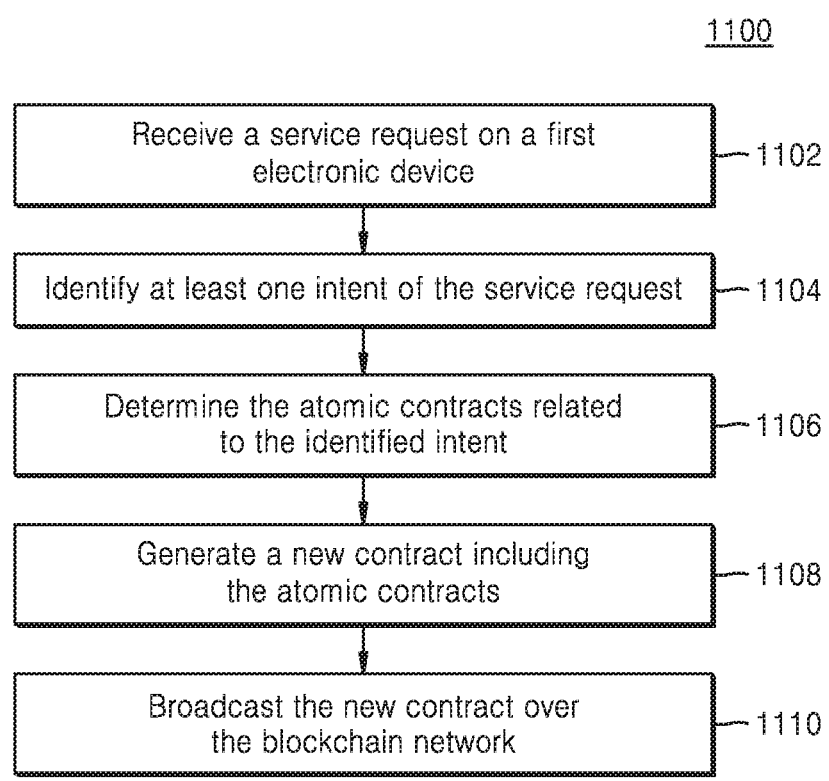
FIG. 11 is a flow diagram illustrating a method to manage a smart contract pipeline in the blockchain network, according to an embodiment of the disclosure.

FIG. 11 is a flow diagram 1100 illustrating a method of managing a smart contract pipeline in the blockchain network, according to an embodiment of the disclosure.

Referring to FIG. 11, in operation 1102 the query parser 402 receives a service request on the first electronic device 102 (shown in FIG. 4).

In operation 1104, the query parser 402 identifies the intent of the user extracted from the service request based on parsing the keywords and/or attributes detected within the service request. The service request is parsed by the query parser 402 to determine service request items and attributes. A plurality of contextual parameters based on the attribute and the service request item are determined. Also, intents of the user are determined based on the plurality of contextual parameters. In some embodiments, the service request item includes an identifier for a service. For example, "cab" or "taxi" can denote an identifier for a taxi service. Attributes include at least one of an identifier indicative of a quality of service, a cost of service and an availability of service. For example, a user query with the keywords "low-cost taxi" provides attributes relating to low cost or inexpensive services. Accordingly, cheap taxi rides are searched for over the blockchain network. In another example, a user query with the statement of "longest life battery" provides attributes relating to a battery product with long-life or a large battery capacity.

The blacklist/whitelist verification engine 404A may map the service request item with an atomic contract available in the blockchain network 210. The atomic contract comprises a chaincode associated with the service request item. In operation 1106, the blacklist/whitelist verification engine 404A may select atomic contracts each of which is related to the identified intent. The transaction predictor 404B may determine that the atomic contract is associated with the whitelist of atomic contracts and the blacklist of atomic contracts. In addition, the plurality of atomic contracts is associated with at least one other device on the blockchain network and the plurality of atomic contracts are verified by the stakeholders of the blockchain network.

In some embodiments, if the atomic contract is new and not deployed over the blockchain network 210, the atomic contract, the associated whitelist and the associated blacklist are broadcast over the blockchain network 210 under the consensus mechanism 406 and are added to the blockchain.

The whitelist of atomic contracts can be used with the atomic contract to perform the service request. On the other hand, the blacklist of atomic contracts is forbidden to be used with the at least one atomic contract to perform the transaction.

In operation 1108, the transaction predictor 404B may dynamically generate a smart contract pipeline—a new smart contract—based on the identified atomic contract, the whitelist of atomic contracts and the blacklist of atomic contracts.

In some embodiments, the smart contract pipeline may include a sequence of multiple atomic contracts bound to each other by one or more attributes of the service request.

In operation 1110, the generated smart contract pipeline may be broadcast over the blockchain network.

Figure 12:
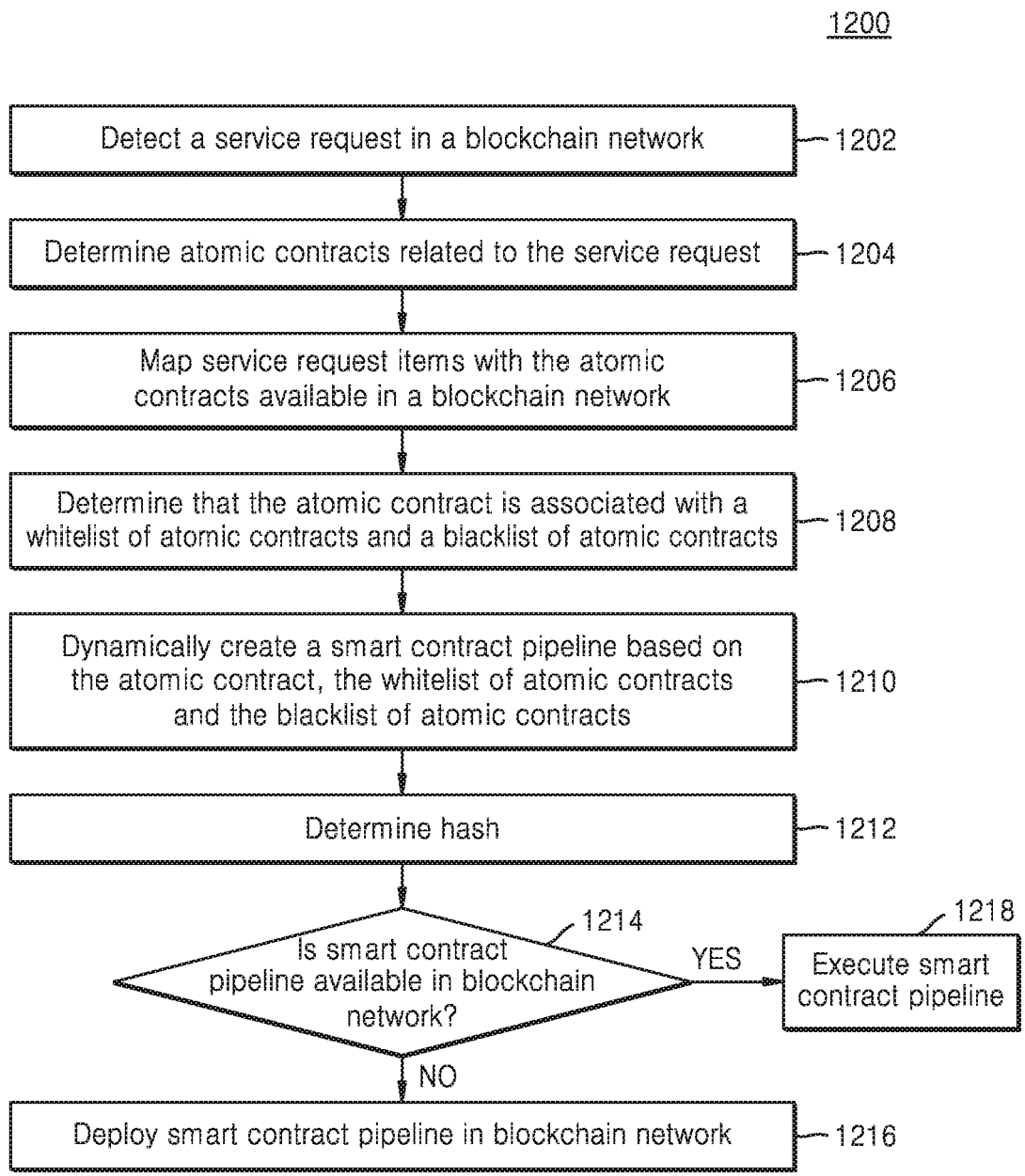
FIG. 12 is a flow diagram illustrating a method to deploy a smart contract pipeline over the blockchain network, according to an embodiment of the disclosure.

FIG. 12 is a flow diagram 1200 illustrating an example scenario to order a product in a specified time, according to an embodiment of the disclosure.

Referring to FIG. 12, in operation 1202 the query parser 402 detects a service request in the blockchain network 210. In operation 1204, the blacklist/whitelist verification engine 404A may determine a plurality of atomic contracts related to the service request. Each of the atomic contracts is associated with a second electronic device distinct from the first electronic device 102 in the blockchain network 210. The second electronic device can be any of the stakeholders 1-N in the blockchain network 210. In operation 1206, the blacklist/whitelist verification engine 404A may further map service request items with the atomic contracts available in the blockchain network 210.

In operation 1208, the transaction predictor 404B determines that the identified atomic contract is associated with a whitelist of atomic contracts and a blacklist of atomic contracts. If the identified atomic contract is not deployed over the blockchain network 210, is the consensus mechanism may broadcast the identified atomic contract on the blockchain network 201 and add the atomic contract, the associated whitelist and the associated blacklist to the blockchain network 210.

In operation 1210, a smart contract pipeline is created and deployed over the blockchain network 210 with the smart contract pipeline connecting the first electronic device 400 and the second electronic device through a sequence of atomic contracts bound to each other by the attributes. In operation 1212, the smart contract pipeline is hashed and stored in a parallel dynamic contracts ledger. In operation 1214, it is checked whether the smart contract pipeline is available in the blockchain network 210. If it is determined that the smart contract pipeline is available in the blockchain network 210, the smart contract is executed in operation 1218. In operation 1216, if the smart contract pipeline is determined to be unavailable in the blockchain network 210, the smart contract pipeline is deployed. If the smart contract pipeline is deployed over the blockchain network 210, the smart contract pipeline is automatically executed in operation 1218.

Figure 13:
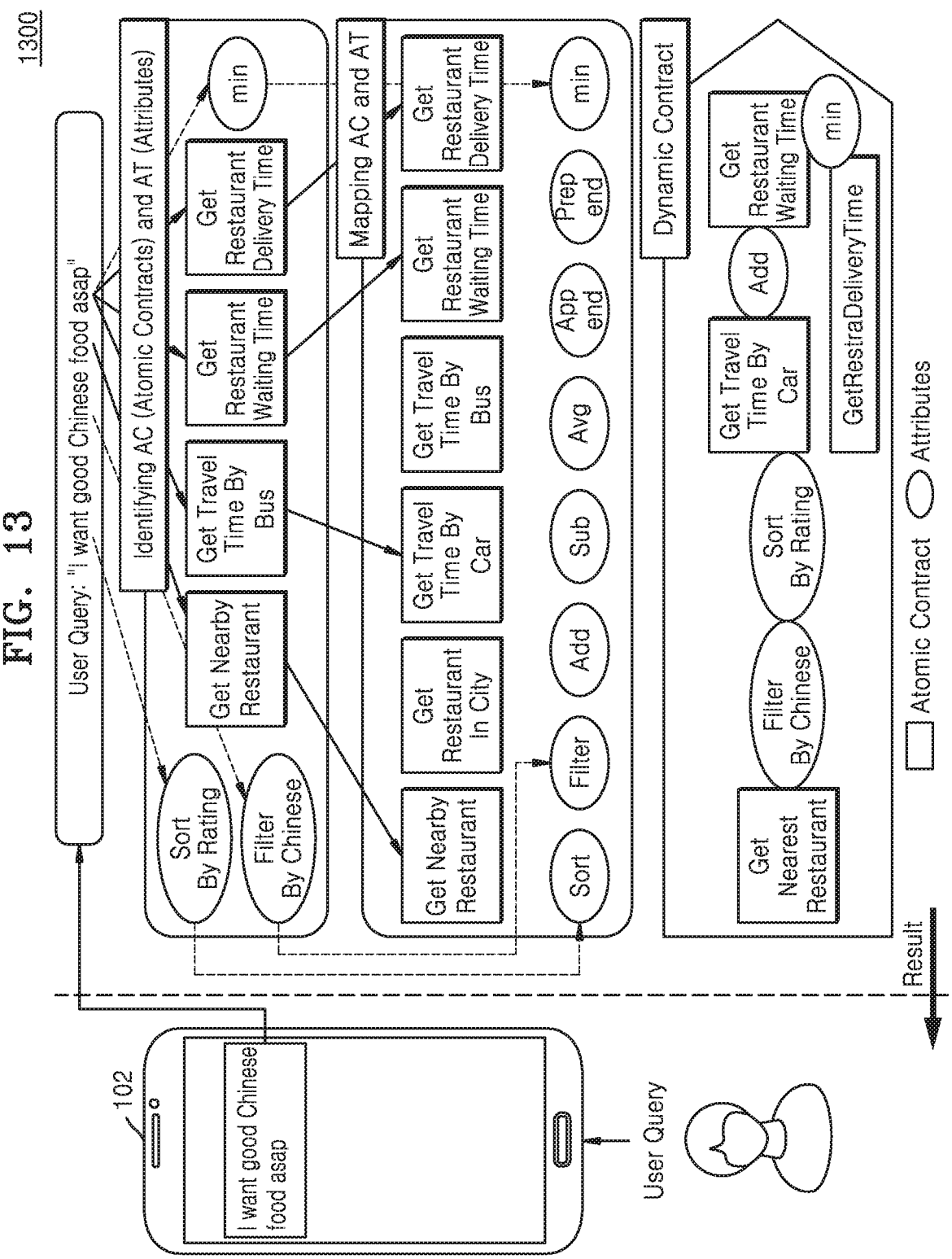
FIG. 13 is an example scenario for deploying a smart contract pipeline based on a service request, according to an embodiment of the disclosure.

FIG. 13 illustrates an example scenario 1300 for deploying a smart contract pipeline based on a service request according to an embodiment of the disclosure.

Referring to FIG. 13, the electronic device 102 receives a service request of "I want good Chinese food asap" from the user. The word "asap" is an acronym for "as soon as possible". Attributes and atomic contracts are identified based on an analysis and parsing of the service request. By the presence of the acronym "asap," the electronic device 102 may determine that the "fastest" service is required and thus it may search for and identify atomic contracts associated with the restaurant nearest to the user. Further, atomic contracts associated with Chinese restaurants nearest to the user with high ratings are filtered based on the attributes of "good," "Chinese," "food," and "asap" included in the service request. The dynamic contract generator 404 (shown in FIG. 4) generates a new smart contract that is integrated by the attributes identified from the service request. The new smart contract is deployed over the blockchain network 210 to execute the requested services. As a result, the new dynamic smart contract is shared with other devices in the blockchain network 210.

FIG. 14 illustrates an example scenario 1400 for deploying a smart contract pipeline based on a service request according to an embodiment of the disclosure.

Referring to FIG. 14, the electronic device 102 receives a service request of "Get me economical taxi to NYC airport with ETA less than 5 minutes" with a voice input or a text-based input by a user of the electronic device 102. The word "ETA" indicates "estimated time of arrival." The attributes "less than 5 minutes" and "economical" are identified apart from atomic contracts associated with "book taxi," "Get cost to NYC airport," "Get ETA". The atomic contract of "book taxi" is identified based on the word "taxi" included in the service request, the atomic contract of "Get cost to NYC airport" is identified based on the word "economical" in the service request, and the atomic contract of "Get ETA" is identified based on the word "ETA less than 5 minutes" in the service request.

By mapping the identified atomic contracts and attributes, the dynamic contract generator 404 generates a smart contract pipeline which is a new smart contract(s) that is integrated by the attributes identified from the foregoing service request. The smart contract pipeline is deployed over the blockchain network 210 to execute the requested services. The user of the electronic device 102 or other electronic devices may receive contract results of "Uber taxi service" and/or "Lyft taxi service" satisfying the attributes in response to the service request.

While the disclosure has been shown described with reference to various embodiments thereof, it will be understood by those skilled in the art that various changes in form and details may be made therein without departing from the spirit and scope of the disclosure as defined by the appended claims and their equivalents.

What is claimed is:

1. A method of managing a service request in a blockchain network, the method comprising:
 receiving, by a first device, a service request;
 identifying at least one intent from the service request;
 identifying a plurality of services included in the service request;
 categorizing the plurality of services based on types of the identified plurality of services, wherein the types are determined based on at least one service request item or at least one attribute;
 establishing a plurality of hierarchical levels each of which corresponds to the plurality of services based on the categorizing;
 selecting a plurality of atomic contracts by filtering the plurality of atomic contracts with a whitelist and a blacklist, wherein each of the plurality of atomic contracts is a complete contract satisfying the at least one intent and corresponds to each of the plurality of services, and previously generated prior to the service request in connection with each of a plurality of second devices on the blockchain network in response to a request similar to the service request and is verified in the blockchain network, and wherein the whitelist is a list of atomic contracts which can be used with the each of the plurality of atomic contracts and the blacklist is a list of atomic contracts which cannot be used with the each of the plurality of atomic contracts;
 determining whether at least one atomic contract, among the plurality of atomic contracts, is unavailable;
 selecting an alternative atomic contract replacing the at least one atomic contract determined to be unavailable, based on the hierarchical level corresponding to a service among the plurality of services which is corresponding to the alternative atomic contract positioned at a same level in the hierarchical level as a service corresponding to the at least one atomic contract determined to be unavailable;
 generating a new contract including the plurality of atomic contracts and the alternative atomic contract replacing the at least one atomic contract determined to be unavailable;
 broadcasting the new contract, the whitelist including a list of atomic contracts which can be used with the new contract and the blacklist including a list of atomic contracts which cannot be used with the new contract, over the blockchain network;
 determining whether a smart contract pipeline is available in the blockchain network; and
 in response to a determination that the smart contract pipeline is not available, deploying the smart contract pipeline in the blockchain network, wherein the smart contract pipeline is deployed by generating the smart contract pipeline including the plurality of atomic contracts and the alternative atomic contract by putting the plurality of atomic contracts and the alternative atomic contract in sequence, parallel or hybrid combinations.

2. The method of claim 1, further comprising:
 determining the at least one service request item or the at least one attribute, by parsing a statement included in the service request; and
 identifying a plurality of keywords based on the at least one service request item or the at least one attribute,
 wherein the identifying of the at least one intent comprises identifying the at least one intent based on the plurality of keywords.

3. The method of claim 2, wherein the selecting of the plurality of atomic contracts, each of which is related to the at least one intent, comprises:
 mapping the at least one service request item or the at least one attribute to at least one among the plurality of atomic contracts.

4. The method of claim 1, wherein the at least one attribute comprises at least one of an identifier indicative of a quality of the service, a cost of the service, time spent for the service, or an availability of the service.

5. The method of claim 1, wherein the generated new contract is added to the blockchain network upon determining a consensus among participants of the blockchain network.

6. The method of claim 1, wherein the new contract, the whitelist including the list of atomic contracts which can be used with the new contract, and the blacklist including the list of atomic contracts which cannot be used with the new contract are verified by participants of the blockchain network on the blockchain network and added to the blockchain network upon approval by the participants.

7. The method of claim 6, further comprising:
 determining that the smart contract pipeline is available in the blockchain network,
 wherein, when the smart contract pipeline is available, executing the smart contract pipeline.

8. The method of claim 1, wherein the service request comprises at least one of a voice request or a text-based request.

9. An apparatus for managing a service request in a blockchain network, comprising:
at least one processor configured to:
identify at least one intent from a service request received by the apparatus,
identify a plurality of services included in the service request,
categorize the plurality of services based on types of the identified plurality of services, wherein the types are determined based on at least one service request item or at least one attribute,
establish a plurality of hierarchical levels each of which corresponds to the plurality of services based on the categorizing,
select a plurality of atomic contracts by filtering the plurality of atomic contracts with a whitelist and a blacklist, wherein each of the plurality of atomic contracts is a complete contract satisfying the at least one intent and corresponds to each of the plurality of services, and previously generated prior to the service request in connection with each of a plurality of second devices on the blockchain network and is verified in the blockchain network in response to a request similar to the service request, and wherein the whitelist is a list of atomic contracts which can be used with the each of the plurality of atomic contracts and the blacklist is a list of atomic contracts which cannot be used with the each of the plurality of atomic contracts,
determine whether at least one atomic contract, among the plurality of atomic contracts, is unavailable,
select an alternative atomic contract replacing the at least one atomic contract determined to be unavailable, based on the hierarchical level corresponding to a service among the plurality of services which is corresponding to the alternative atomic contract positioned at a same level in the hierarchical level as a service corresponding to the at least one atomic contract determined to be unavailable,
generate a new contract including the plurality of atomic contracts and the alternative atomic contract replacing the at least one atomic contract determined to be unavailable,
determine whether a smart contract pipeline is available in the blockchain network, and
in response to a determination that the smart contract pipeline is not available, deploy the smart contract pipeline in the blockchain network, wherein the smart contract pipeline is deployed by generating the smart contract pipeline including the plurality of atomic contracts and the alternative atomic contract by putting the plurality of atomic contracts and the alternative atomic contract in sequence, parallel or hybrid combinations; and
a transceiver for broadcasting the new contract, the whitelist including a list of atomic contracts which can be used with the new contract, and the blacklist including a list of atomic contracts which cannot be used with the new contract, over the blockchain network.

10. The apparatus of claim 9,
wherein the at least one processor is further configured to:
determine the at least one service request item or the at least one attribute, by parsing a statement included in the service request; and
identify a plurality of keywords based on the at least one service request item or the at least one attribute, and
wherein the identifying of the at least one intent comprises identifying the at least one intent based on the plurality of keywords.

11. A non-transitory computer program product comprising a computer readable storage medium having a computer readable program stored therein, the computer readable program, when executed on a first device configured to execute instructions, cause the first device to:
receive, by the first device, a service request;
identify at least one intent from the service request;
identify a plurality of services included in the service request;
categorize the plurality of services based on types of the identified plurality of services, wherein the types are determined based on at least one service request item or at least one attribute;
establish a plurality of hierarchical levels each of which corresponds to the plurality of services based on the categorizing;
select a plurality of atomic contracts by filtering the plurality of atomic contracts with a whitelist and a blacklist, wherein each of the plurality of atomic contracts is a complete contract satisfying the at least one intent and corresponds to each of the plurality of services, and previously generated prior to the service request in connection with each of a plurality of second devices on a blockchain network in response to a request similar to the service request and is verified in the blockchain network, and wherein the whitelist is a list of atomic contracts which can be used with the each of the plurality of atomic contracts and the blacklist is a list of atomic contracts which cannot be used with the each of the plurality of atomic contracts;
determine whether at least one atomic contract, among the plurality of atomic contracts, is unavailable;
select an alternative atomic contract replacing the at least one atomic contract determined to be unavailable, based on the hierarchical level corresponding to a service among the plurality of services which is corresponding to the alternative atomic contract positioned at a same level in the hierarchical level as a service corresponding to the at least one atomic contract determined to be unavailable;
generate a new contract including the plurality of atomic contracts and the alternative atomic contract replacing the at least one atomic contract determined to be unavailable;
broadcast the new contract the whitelist including a list of atomic contracts which can be used with the new contract and the blacklist including a list of atomic contracts which cannot be used with the new contract, over the blockchain network;
generate a new contract including the plurality of atomic contracts and the alternative atomic contract replacing the at least one atomic contract determined to be unavailable;
determine whether a smart contract pipeline is available in the blockchain network; and
in response to a determination that the smart contract pipeline is not available, deploy the smart contract pipeline in the blockchain network, wherein the smart contract pipeline is deployed by generating the smart contract pipeline including the plurality of atomic contracts and the alternative atomic contract by putting the plurality of atomic contracts and the alternative atomic contract in sequence, parallel or hybrid combinations.

* * * * *